United States Patent
Hirokawa

[19]

[11] Patent Number: 5,864,329
[45] Date of Patent: Jan. 26, 1999

[54] DEVICE AND METHOD FOR DIGITAL PICTURE UNIVERSAL MULTIPLICATION

[75] Inventor: Nobuyuki Hirokawa, Niigata, Japan

[73] Assignee: NEC Corporation, Tokyo, Japan

[21] Appl. No.: 562,917

[22] Filed: Nov. 27, 1995

[30] Foreign Application Priority Data

Nov. 28, 1994 [JP] Japan ................................. 6-292841

[51] Int. Cl.$^6$ .................................................. G09G 1/00
[52] U.S. Cl. ........................... 345/115; 345/113; 382/299
[58] Field of Search .................. 345/115, 116, 345/112, 113, 141, 154, 150, 153, 31, 32, 151, 152, 132, 131, 138, 342, 438; 359/139, 121; 382/293–300

[56] References Cited

U.S. PATENT DOCUMENTS

| | | | |
|---|---|---|---|
| 4,375,079 | 2/1983 | Ricketts et al. | 345/116 |
| 4,630,039 | 12/1986 | Shimada | 345/141 |
| 4,992,781 | 2/1991 | Iwasaki et al. | 345/115 |
| 5,193,126 | 3/1993 | Matsuki | 382/298 |
| 5,357,264 | 10/1994 | Itoh et al. | 345/112 |
| 5,416,614 | 5/1995 | Crawford | 345/154 |
| 5,528,704 | 6/1996 | Parker et al. | 382/299 |
| 5,546,194 | 8/1996 | Ross | 382/298 |
| 5,555,557 | 9/1996 | Mailloux | 382/299 |
| 5,572,234 | 11/1996 | Dohnal | 345/132 |
| 5,594,467 | 1/1997 | Marlton et al. | 345/115 |
| 5,630,105 | 5/1997 | Hagaki | 345/113 |

OTHER PUBLICATIONS

"Facsimile Scanning Density Conversion by Geometrical Mode", Yamamoto, et al, KDD Research and Development Laboratory, Nov. 3, 1975 pp. 37–44.

*Primary Examiner*—Chanh Nguyen
*Assistant Examiner*—John Suraci
*Attorney, Agent, or Firm*—Laff, Whitesel, Conte & Saret, Ltd.

[57] ABSTRACT

A first picture composed of first pixels including a first number thereof arrayed in a first direction and individually having a first image data is multiplied to provide a second picture composed of second pixels including a second number thereof arrayed in a second direction and individually having a second image data. An association is effected between each of the first number of first pixels and a total of h of the second number of second pixels, where h is an integer digitally equivalent to a multiplication factor, before a total of h fractions of the first image data are distributed to the h second pixels, as the second image data thereof, so that a compositional context of a first image representable by the first image data is substantially left in a second image representable by the second image data, permitting a directionally deformable multiplication of a digital picture.

7 Claims, 12 Drawing Sheets

FIG. 1A
PRIOR ART
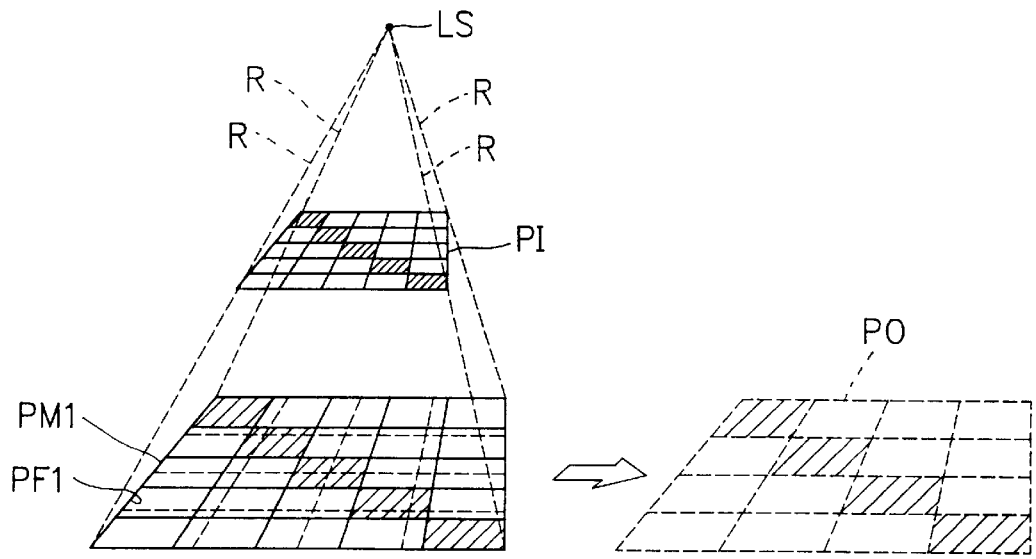
FIG. 1B
PRIOR ART
FIG. 1C
PRIOR ART
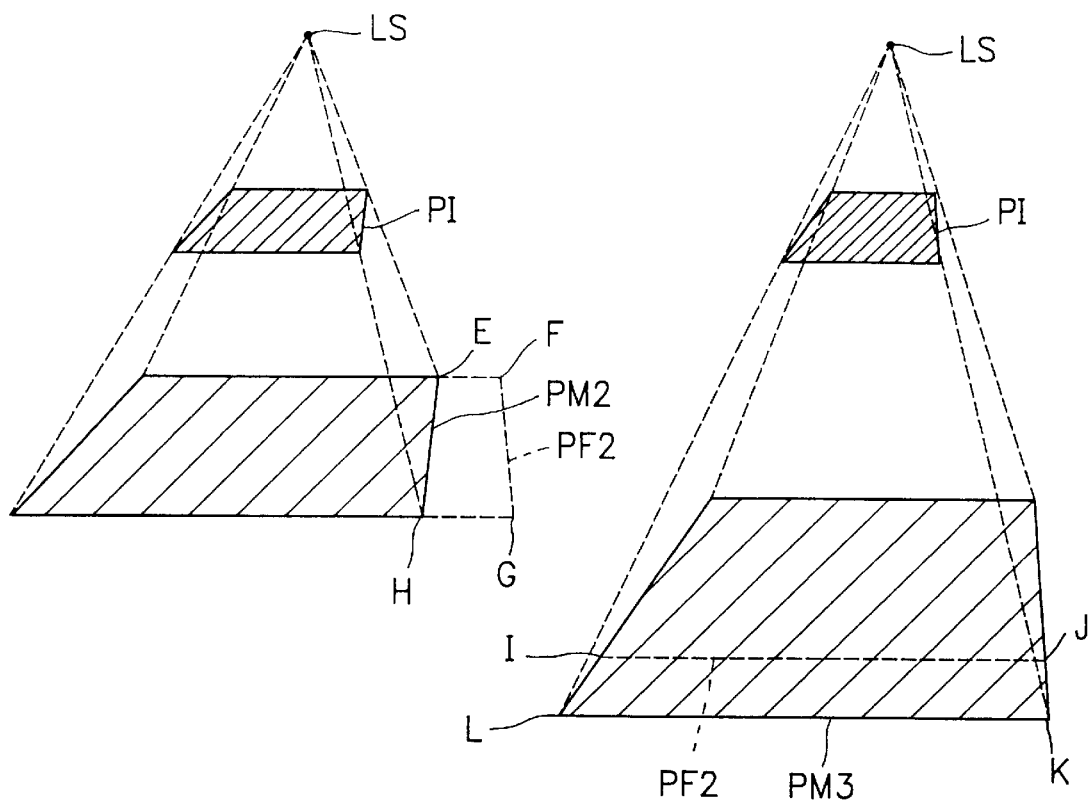

FIG. 2
PRIOR ART

| | $x_{11}$ | $x_{12}$ | $x_{13}$ | $x_{14}$ | $x_{15}$ |
|---|---|---|---|---|---|
| $P_x(a,b)$ / P100 | $y_{11}$ | $y_{12}$ | | $y_{13}$ | $y_{14}$ |
| P200 --- $P_y(c,d)$ | $x_{21}$ | $x_{22}$ | $x_{23}$ | $x_{24}$ | $x_{25}$ |
| | $y_{21}$ | $y_{22}$ | | $y_{23}$ | $y_{24}$ |
| | $x_{31}$ | $x_{32}$ | $x_{33}$ | $x_{34}$ | $x_{35}$ |
| | $y_{31}$ | $y_{32}$ | | $y_{33}$ | $y_{34}$ |
| | $x_{41}$ | $x_{42}$ | $x_{43}$ | $x_{44}$ | $x_{45}$ |
| | $x_{51}$ | $x_{52}$ | $x_{53}$ | $x_{54}$ | $x_{55}$ |
| | $y_{41}$ | $y_{42}$ | | $y_{43}$ | $y_{44}$ |

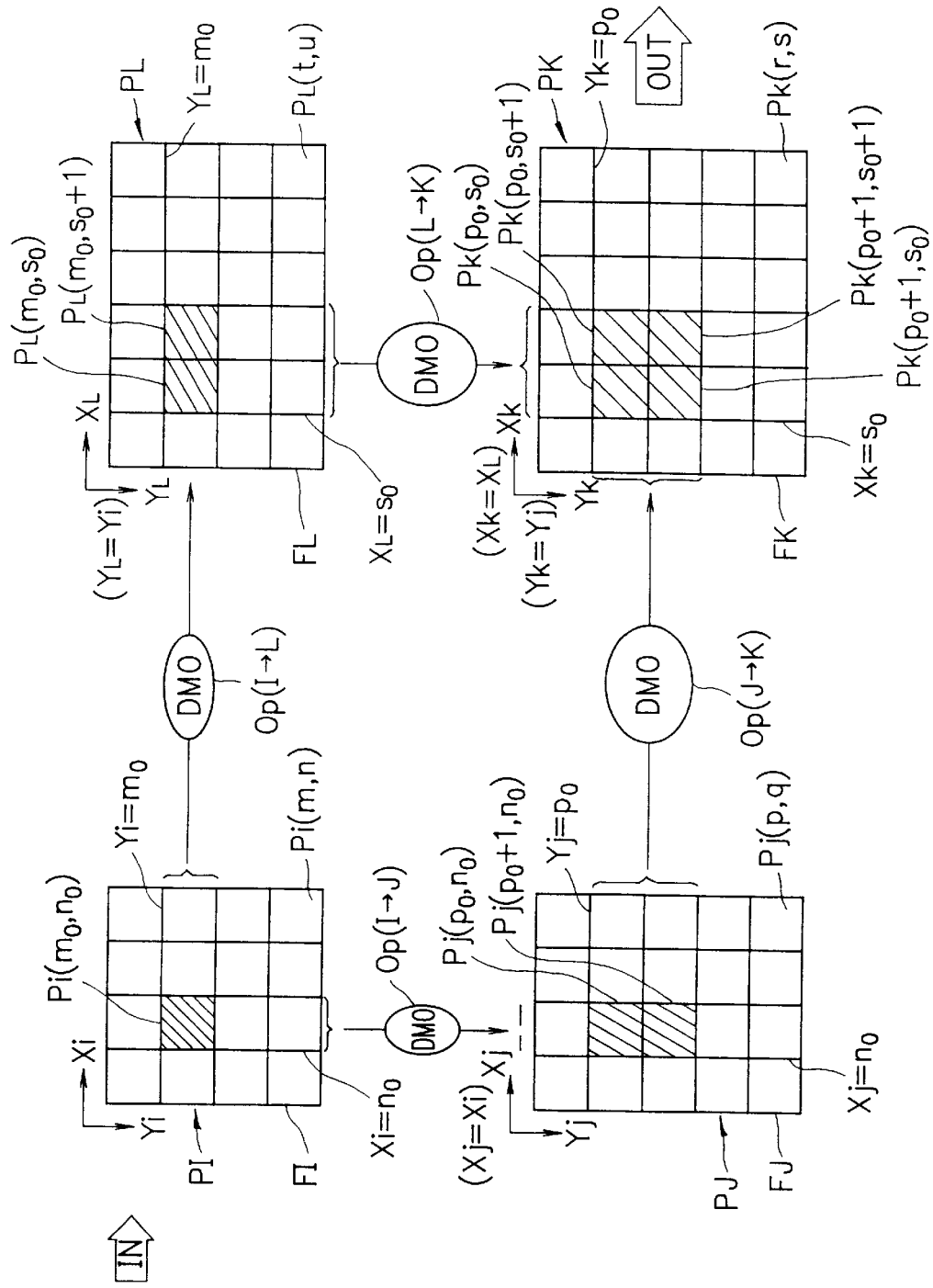

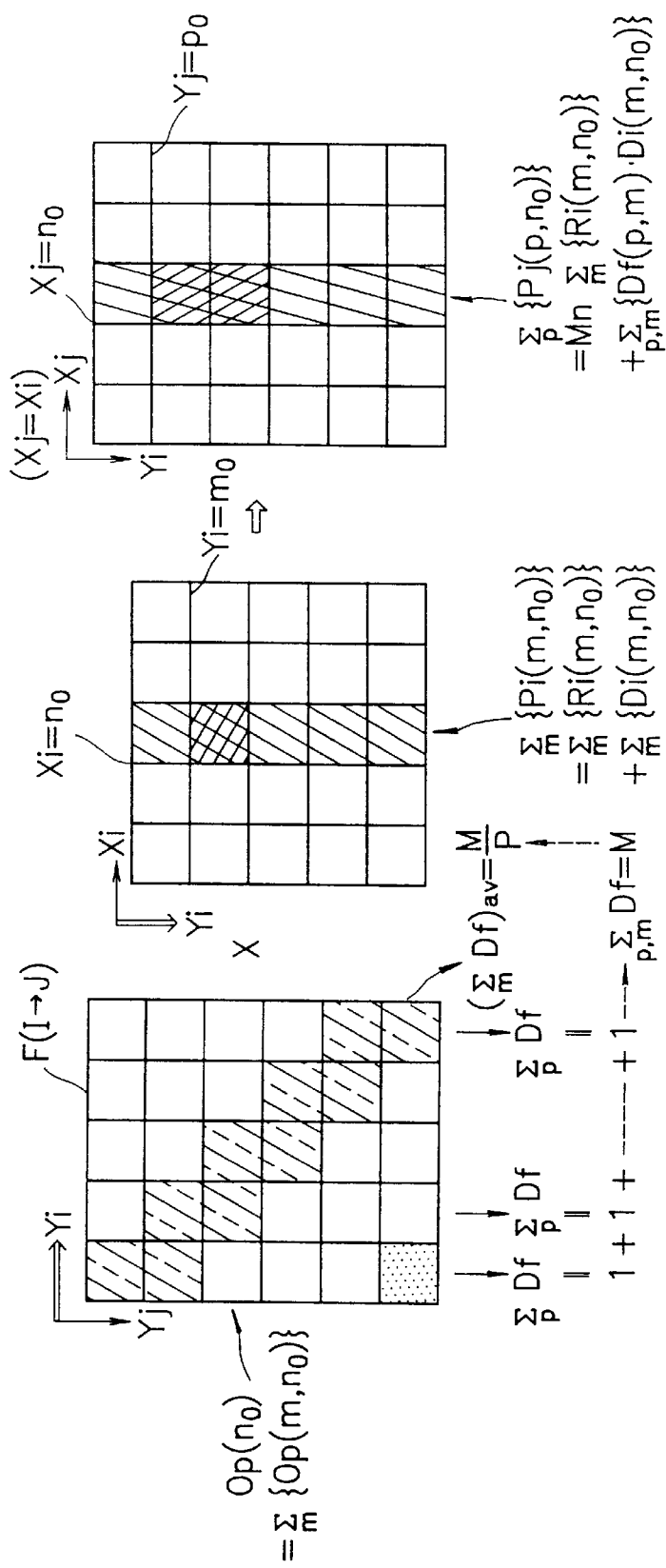

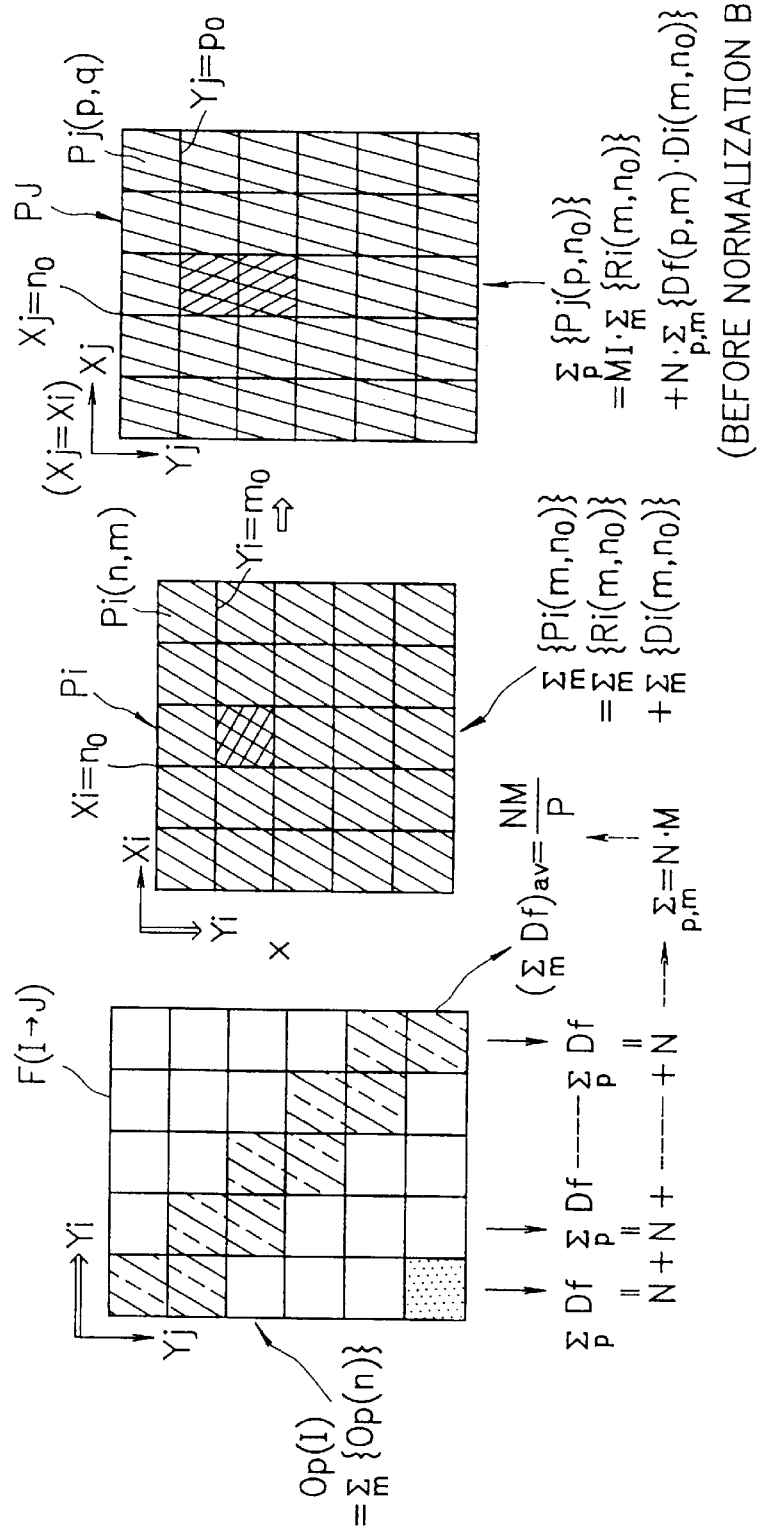
F I G. 5D

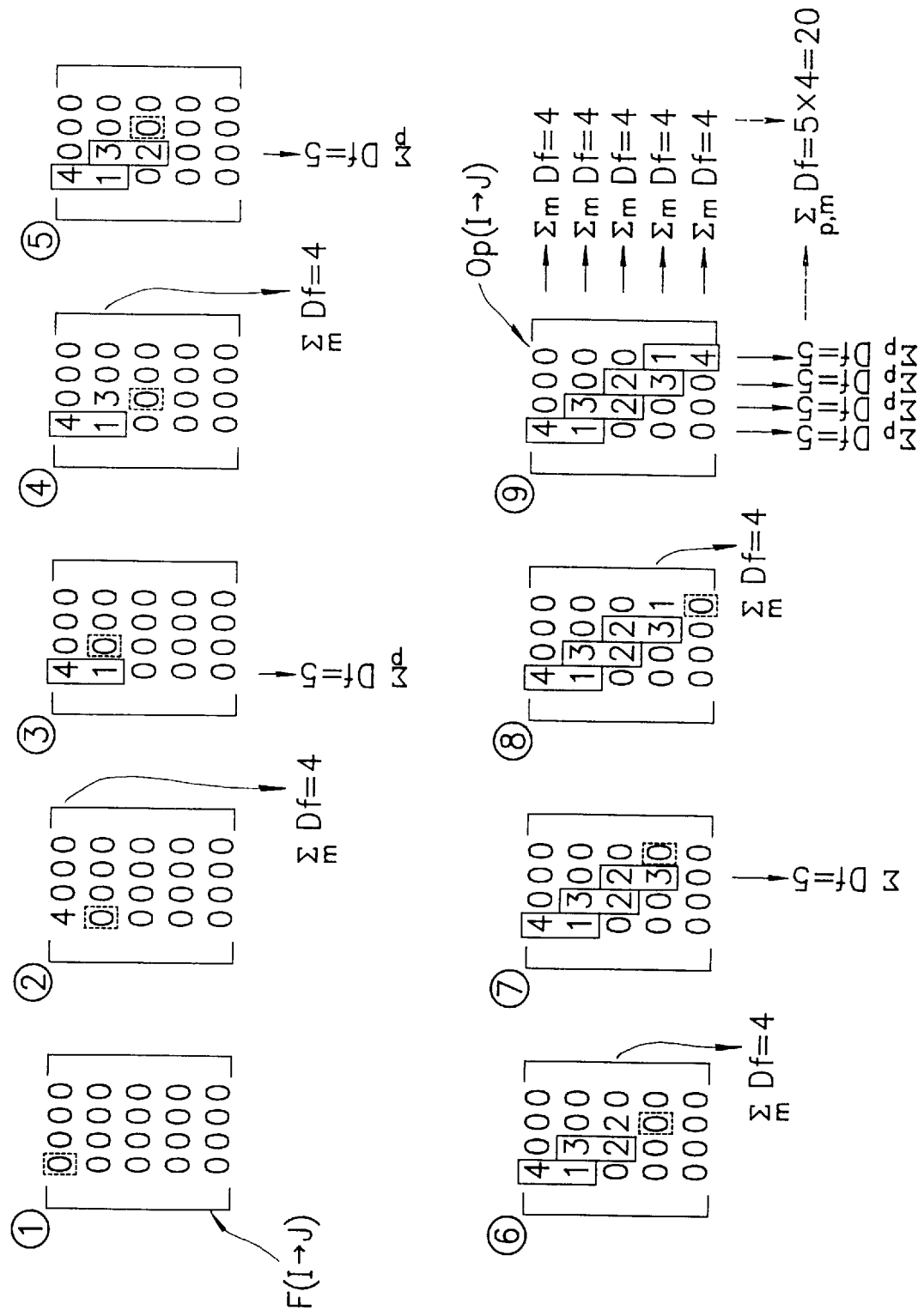

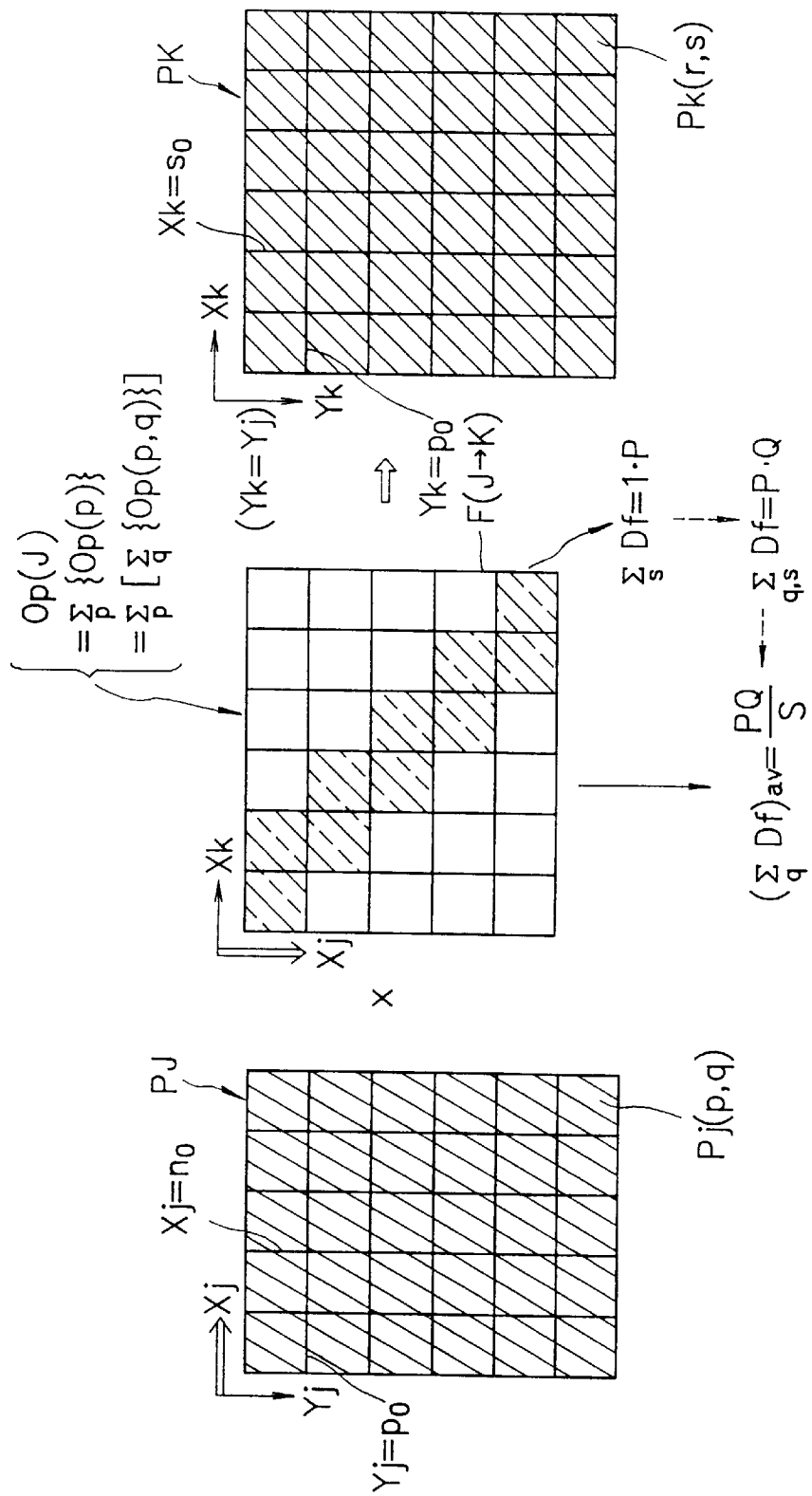

FIG. 9A
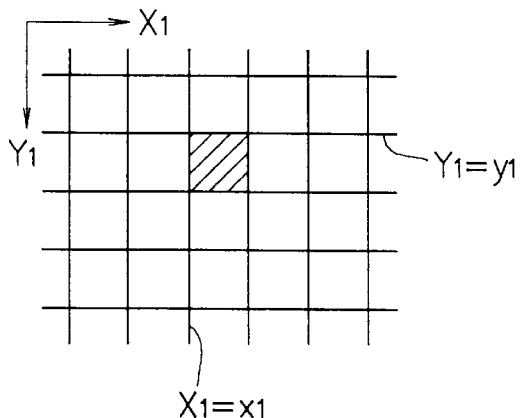
FIG. 9C   FIG. 9B   FIG. 9D
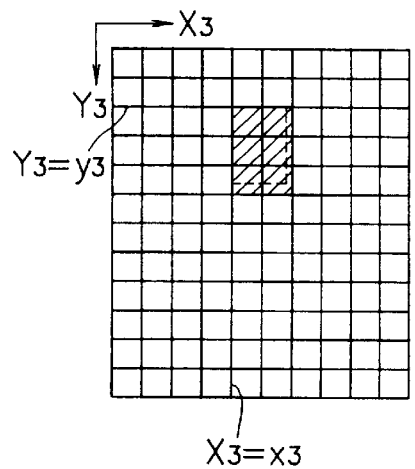 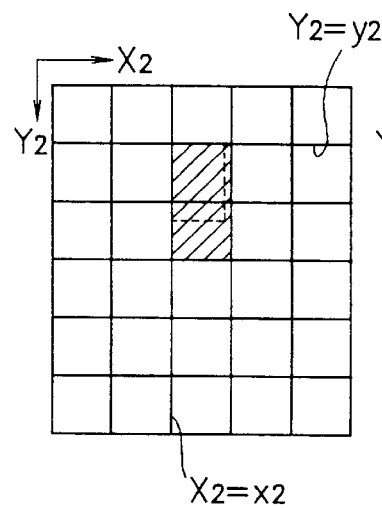 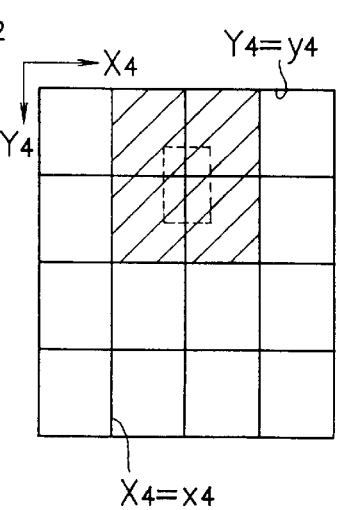
FIG. 9E
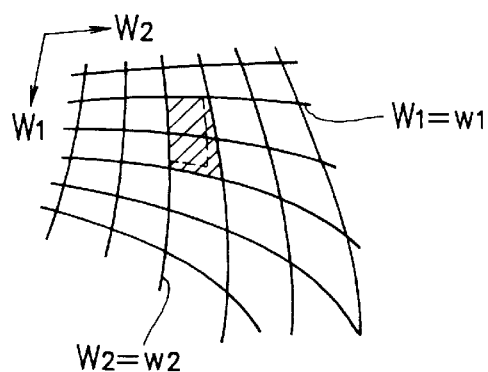

5,864,329

DEVICE AND METHOD FOR DIGITAL PICTURE UNIVERSAL MULTIPLICATION

BACKGROUND OF THE INVENTION

The present invention generally relates to a digital picture multiplication device and a digital picture multiplication method, and particularly, to a device and a method for a single- and/or multi-dimensional even and/or biased extension, magnification, contraction and/or deformation (hereafter collectively "universal multiplication" or simply "multiplication") of a binary or multi-value digital picture, or in other words, a universal conversion in number and/or arrangement of pixels in a digital picture, permitting a compositional context of an original image to be substantially held.

1. Description of the Related Art

Recent years have observed an increasing need for a multiplication of a digital picture in a variety of fields such as of a digital copier, facsimile, printer, recorder, editor, monitor, projector, television, virtual image processor, etc. (hereafter collectively "digital image processor").

In fields of an analog picture, a multiplication is a typical technique that one can do by knowledge of a projection and/or interpolation, in which a continuous variation of an image is promised.

In contrast, in a digital picture, any image is composed of a set of pixels individually allowed to have one of a limited number of discrete states of representation, such as a black and a white. Still less, no pixel in a picture can be deformed or divided.

However, there were several pioneers in the digital field also. They made their own ways, developing their methods for a digital picture multiplication. As one of most successful developments, there was a multiplication method consistent with an intuitive projection concept. As still advancing now, the multiplication method is well known as a dot density conversion method relatively high of a picture quality. Each dot corresponds to a pixel.

FIGS. 1A to 1C are illustrations for describing a principle of the projection concept.

In FIG. 1A, according to the projection concept, an original or input picture PI is projected, by rays R of light from an imaginary point light source LS, onto an output picture format $PF_1$ (broken line) to have a multiplied picture $PM_1$ (solid line) mapped thereon as an ideal target picture to be imitated in an image data processing of the input picture PI to obtain an output picture PO.

The input picture PI is formatted, e.g., to a matrix of 5A×5B pixels, where A and B are positive integers. The output picture format $PF_1$ comprises, e.g., a matrix of 4C×4D pixels, where C and D are positive integers. In the case of FIG. 1A, 5A=4C and 5B=4D so that the multiplied picture $PM_1$ just overlaps the picture format $PF_1$ and hence the output picture PO represents the same region as the input picture PI.

In a case of 5A<4C and 5B=4D, as shown in FIG. 1B, a multiplied picture $PM_2$ overlaps part of an output picture format $PF_2$ so that a rectangular peripheral region □EFGH is left, as it is blank, and hence an output picture represents an entire region of an input picture PI and a rectangular blank region which may be displayed in black.

In a case of 5A=4C and 5B>4D, as shown in FIG. 1C, a multiplied picture $PM_3$ covers, with part thereof, an entire region of an output picture format $PF_3$ and has a rectangular peripheral region □IJKL thereof exceeding the format $PF_3$, so that an output picture represents part of an input picture PI.

The density conversion method employs an algorithm to determine a density relationship for a direct conversion from a two-dimensional subset of pixels of an input picture to a two-dimensional subset of pixels of a multiplied picture in consistency with the projection concept.

The algorithm is simplified, assuming that the conversion is made between binary values.

The simplification is based on a geometrical mode conversion which has been introduced by a Technical Report of the Institute of Electronics and Communication Engineers of Japan, Vol. 75, No. 147, IE75-November, 1975, pp. 37–44.

The geometrical mode conversion classifies into a number of pattern modes a set of geometrical relationships between a respective one of pixels of a picture to be output and a number of pixels vicinal thereto in an input picture, to have a distribution of the modes determined to be stored in a form of a conversion table, before using the table for a conversion of pixel-matrix size from the input picture to the output picture.

FIG. 2 shows a diagram of a 5×5 pixel matrix of a left-upper portion of an input picture overlapping a 4×4 pixel matrix of a left-upper portion of an output picture, for describing the geometrical mode conversion, An input picture P100 comprises a set $\{x_{ab}\}$ of digital image data $x_{ab}$ formatted for a 5A×5B matrix of imaginary pixels Px(a,b) defined by solid lines in FIG. 2, where A and B are positive integers, and "a" and "b" are arbitrary integers such that $1 \leq a \leq 5A$ and $1 < b5B$, respectively.

The input picture P100 is multiplied by a fraction of 16/25 so that an output picture P200 is composed of a set $\{y_{cd}\}$ of digital image data $y_{cd}$ formatted for a 4C×4D matrix of imaginary pixels Py(c,d) defined by broken lines in FIG. 2, where C and D are positive integers such that 4C=5A and 4D=5D, respectively, and "c" and "d" are arbitrary integers such that $1 \leq c \leq 4C$ and $1 \leq d \leq 4D$, respectively.

When the input and output pictures P100 and P200 are monitored by an unshown input monitor and an unshown output monitor, respectively, if a display of the output monitor has the same size as a display of the input monitor, a respective one of 4C×4D actual pixels of the output monitor should display an image segment that is substantially identical in sense of vision to a combination of image segments displayed by those of 5A×5B actual pixels of the input monitor which partially or wholly overlap the above-mentioned respective pixel of the output monitor, as the display of the output monitor is supposed to be standing just in front of or behind that of the input monitor.

To be adaptive to such the requirement, among the image data $Y_{cd}$ of the output picture P200, that one $Y_{cd}(c=c_0,d=d_0)$, which is assigned to an arbitrary one $Py(c_0,d_0)$ of the imaginary pixels Py(c,d), has a digital value thereof determined in accordance with a normalized value of a weighted sum $\Sigma[f(a,b) \cdot X_{ab}]$ of image data $X_{ab}$ of those imaginary pixels Px(a,b) of the input picture P100 which partially or wholly overlap the above-mentioned arbitrary pixel $Py(c_0, d_0)$ of the output picture P200 when projected, where the suffix "0" collectively represents one or more particular integers in concern within an arbitrary defined range of integers, and "f(a,b)" (hereafter sometimes simply ("f") is a weighting factor of a corresponding pixel Px(a,b).

The weighting factor f(a,b) is proportional to an area by which the corresponding pixel Px(a,b) in the input picture P100 overlaps a concerned pixel $Py(c_0,d_0)$ of the output picture P200.

For example, in a region of a first-row, first-column pixel $Py(c_0,d_0)$ ($c_0=1,d_0=1$) of the output picture P200, there are four pixels Px(a,b) (a=1~2,b=1~2) of the input picture P100 overlapping therewith, wholly or in part, with an area ratio of 16:4:4:1. The four pixels Px(1,1), Px(1,2), Px(2,1) and Px(2,2) have their binary data values $x_{11}$, $x_{12}$, $x_{21}$ and $x_{22}$ and weighting factors f(1,1) (=16), f(1,2) (=4), f(2,1) (=4) and f(2,2) (=1). Accordingly, a weighted sum $\Sigma[fx_{ab}]$ of them is calculated such that:

$$\Sigma[fx_{ab}]=16x_{11}+4x_{12}+4x_{21}+1x_{22}.$$

The weighted sum $\Sigma[fx_{ab}]$ is then divided by a sum Sf (=Σf=16+4+4+1=25) of the weighting factors f to determine a normalized value, which is digitized by using a threshold value to provide a binary data value $y_{11}$ for the pixel Py(1, 1) of the output picture P200.

Likewise, a data value $y_{cd}$ is calculated for each pixel Py(c, d) of the output picture P200. In the case of FIG. 2, such calculations amount to 16 patterns in total.

In any pattern of such calculation, an associated combination of weighting factors f(a,b) as well as a sum Sf of them can be predetermined, as a particular factor (=16/25) of the picture multiplication is provided, allowing an area ratio to be geometrically determined.

Therefore, a necessary number of combinations of conversion factors fc=f(a,b)/Sf are calculated in advance, and stored in a matrix form as a conversion table for use in a geometrical mode dot-density conversion from an input picture to an output picture, which may employ a logical expression such as for a pixel assignment and/or a pattern repetition.

It is unavoidable for the conventional method to use a conversion table to permit a picture multiplication to be processed at a practical speed.

Therefore, the conventional method can simply serve for an order-made picture multiplication in which a multiplication factor is fixed, in addition to that a memory with a significant capacity is necessary for storing a conversion table and that a significant man-hour is needed to provide for the conversion table.

Moreover, the conventional method can simply serve for a two-dimensional even multiplication in which an output picture coincides with an input picture in respect of a frame form, to use an entire region of the output picture for displaying an entire region of the input picture.

In other words, it is difficult for the conventional method to be flexibly adaptive to a single-dimensional multiplication or extension in which a frame of an output picture does not coincide with a frame of an input picture, or to any multi-dimensional multiplication other than a two-dimensional.

Further, it is hard for the conventional method to execute a biassed or deforming picture multiplication in which an equi-density is not guaranteed, whatsoever.

Such various restrictions in application of the conventional method seems owing to a conventional projection concept in which a single shot develops a final target picture and in which a better imitation to the target picture guarantees a better quality.

The present inventor thought the digital process should inherently be stepwise for a better flexibility; the digital image should inherently be a limited number of bits unable to be fully responsible for an excessive duty.

The present invention has been achieved with these points in mind.

SUMMARY OF THE INVENTION

It therefore is an object of the present invention to provide a device and a method for a universal digital picture multiplication adaptive to an arbitrary conversion in number and/or arrangement of pixels in a digital picture, from a distinctive view point based on a novel directional multiplication concept in which a pixel is multiplied in a desired direction.

A principle of the directional multiplication concept and one of simplest applications thereof are illustrated in FIGS. 3A to 3C and FIG. 4, respectively, to permit an intuitive perception for a better comprehension of the invention.

FIG. 3A shows part of an input picture PI composed of a set of imaginary pixels Pi(m,n) (defined by solid lines), where "m" and "n" are arbitrary integers.

As shown in FIGS. 3A and 3B, each pixel Pi(m,n) of the input picture PI is characterized by: a region Ri(m,n) thereof (enclosed by broken lines) as a unit area of the picture PI that is defined by a combination of a pair of neighboring coordinates m and m+1 in terms of a first coordinate axis Yi in a digital coordinate system Yi-Xi associated with a given format FI for the input picture PI, such that Yi=m and Yi=m+1, and a pair of neighboring coordinates n and n+1 in terms of a second coordinate axis Xi of the coordinate system Yi-Xi, such that Xi=n and Xi=n+1; and an image data as a normalized duty Di(m,n) (represented by a density of hatching for the convenience of visualization) that is a responsibility of the pixel Pi(m,n) to serve for a digital image display.

All associated pixels Pi(m,n) are arrayed to constitute the input picture PI in accordance with the format FI so that a resultant pixel matrix I={$I_{mn}$} has at an m-th column in an n-th row thereof a valued element $I_{mn}$ identical to a combination of Ri(m,n) and Di(m,n).

The pixel matrix I is processed, as illustrated in FIG. 3B, by subjecting each element $I_{mn}$ thereof to an operation $I_{mn} \times Op$ or $Op \times I_{mn}$ of a directional multiplication operator (hereafter sometimes "DMO") Op(I→J) operative in accordance with the directional multiplication concept so that the region Ri(m,n) of any pixel Pi(m,n) is multiplied in a desired direction (e.g. in a column direction represented by an arrow in FIG. 3B) by a desired multiplication factor $M_{mn}$ element-wise variable, and the duty Di(m,n) of the pixel Pi(m,n) is distributed along the desired direction, evenly or unevenly in a controlled manner.

For a simplicity, the duty Di(m,n) is now assumed to be null, but for a particular pixel Pi($m_0$,$n_0$) in concern. The concerned pixel Pi($m_0$,$n_0$) has a region Ri($m_0$,$n_0$) defined by a pair of Xi coordinates $n_0$ and $n_0$+1 and a pair of Yi coordinates $m_0$ and $m_0$+1, and a significant positive duty Di($m_0$,$n_0$).

FIG. 3C shows part of a directionally multiplied picture PJ composed of a set of imaginary pixels Pj(p,q), where "p" and "q" are arbitrary integers.

In the multiplied picture PJ, each pixel Pj(p,q) is characterized by: a region Rj(p,q) thereof as a unit area of the picture PJ that is defined by a combination of a pair of neighboring coordinates p and p+1 in terms of a first coordinate axis Yj in a digital coordinate system Yj-Xj associated with a DMO-dependent or externally required format FJ for the multiplied picture PJ, such that Yj=p and Yi=p+1, and a pair of neighboring coordinates q and q+1 in terms of a second coordinate axis Xj (equivalent to Xi within a definition range thereof) of the coordinate system Yj-Xj, such that Xj=q and Xj=q+1; and an image data as a total duty Dj(p,q) equivalent to an arithmetic sum of those fractions of duties Di(m,n) which are distributed by the DMO Op(I→J) from any and all pixels Pi(m,n) of the input picture PI onto the region Rj(p,q).

The concerned pixel $Pi(m_0,n_0)$ in the input picture PI as well as other pixels $Pi(m,n)$ thereof is multiplied by the DMO $Op(I \rightarrow J)$ so that the region $Ri(m_0,n_0)$ is oblique mapped on the format FJ for the multiplied picture PJ, threoretically as "a corresponding analog region" Ri' (enclosed by broken lines) defined by a pair of Xj coordinates $n_0$ and $n_0+1$ and a pair of marginal lines $Y=y_0$ and $Y=y_0'$ such that $y_0 = m_0 \times M_{mn}$ and $y_0'=(m_0+1) \times M_{mn}$, respectively, where Y is an unshown analog coordinate axis overlapping the digital coordinate axis Yj, and digitally as "a connected digital region" Rc defined by the pair of Xj coordinates $n_0$ and $n_0+1$ and a pair of Yj coordinates $p_0$ and $p_0'$ such that $p_0=INT[y_0]$ and $P_0'=INT[y_0']$, where $INT[x]$ is a step function that means an integer lying within a range [x, x+1) of a real number variant x.

The multiplication factor $M_{mn}$ is determined, as circumstances require. In a simplest case, it may be informed from an external source to the DMO $Op(I \rightarrow J)$.

In a desirable case in which the DMO $Op(I \rightarrow J)$ is generated by an associated DMO generator, the format FI as a given one and the format FJ as a desired one may be interrogated from the generator, for a comparison therebetween.

The format FJ as well as the format FI is an imaginary lattice described in a brain of a system designer in which any pixel region $Ri(p,q)$ corresponding to any real pixel of any form may comprise a square with four sides of a unit length, but may be irregular in column length of pixels or broken or cut in part due to a correspondency with a real display that may not always have a rectangular frame and a horizontal position, i.e., it may be e.g. a bottom-reduced projector facing a narrow street, a flat display for a fisheye or wall-enveloping representation or a virtual image display using a normal video tape, or positioned oblique along an escalator or hidden in part to a watcher who may need an entirety of information to be provided from a single display.

Moreover, any direction defined on a format is also an imaginary one that is simply needed to have a designed relationship to an arbitrary direction defined on a real display, and may be straight, folded, curved or spirally wound or may be mobile.

The DMO however is expected to be adaptive to any such case, whenever a digitally processible relationship can be designed.

Therefore, the multiplication factor $M_{mn}$ for any pixel $Pi(m,n)$ in an arbitrary n-th pixel column of the picture PI is determined element wise so that an effective column length as a total number of effective pixels in the n-th column is directionally multiplied to be digitally equivalent to an effective column length as a total number of effective pixels $Pj(p,q)$ in a corresponding n-th pixel column of the picture PJ, with an even or biased density.

To this point, any ineffective pixels may be deleted, at a PI or PJ end or at both thereof, by inserting an additional step for relating each pixel in a connected region of an intermediate picture to a corresponding one of discrete pixels in the picture PI or PJ. Thus, it is assumed in the description hereof that each pixel column as well as each pixel row is composed of a number of connected pixels.

In the case of FIGS. 3A to 3C, the region $Ri(m_0,n_0)$ of the pixel $Pi(m_0,n_0)$ is multiplied by a corresponding multiplication factor $M_{mn}$ in a column direction, to constitute a connected region Rc defined by a combination of $Xj=n_0$, $Xj=n_0+1$, $Yj=p_0$ and $Yj=P_0+2$ ($=p_0'$) in the format FJ.

In other words, by operation of $Op(I \rightarrow J) \times I$, the region $Ri(m_0,n_0)$ of the pixel $Pi(m_0,n_0)$ is associated with the connected region Rc consisting of a pair of connected pixel regions $Rj(p_0,n_0)$ and $Rj(p_0+1,n_0)$, and the duty $Di(m_0,n_0)$ of the pixel $Pi(m_0,n_0)$ is distributed over the connected region Rc so that the pixel regions $Rj(p_0,n_0)$ and $Ri(p_0+1,n_0)$ have their duty fractions $Dj(p_0,n_0)$ and $Dj(p_0+1,n_0)$ attributable thereto.

Such an operation may be executed in any direction and of any pixel of any picture, any times, by employing a corresponding DMO.

FIG. 4 shows one of the simplest applications in that sense. Like members and items to FIGS. 3A to 3C are designated by like reference characters.

An input picture PI is multiplied in a column direction by a DMO $Op(I \rightarrow J)$ to obtain a multiplied picture PJ, so that a certain pixel $Pi(m_0,n_0)$ at an $m_0$-th column in an $n_0$-th pixel row of the picture PI is converted into a pair of connected pixels $Pi(p_0,n_0)$ and $Pj(p_0+1, n_0)$ in an $n_0$-th pixel column of the picture PJ.

Then, the multiplied picture PJ is multiplied in a row direction by a DMO $Op(J \rightarrow K)$ to obtain a further multiplied picture PK to be output.

The picture PK is composed of a set of imaginary pixels $Pk(r,s)$, where "r" and "s" are arbitrary integers. In the picture PK also, each pixel $Pk(r,s)$ is characterized by: a region thereof (to be referenced by $Rk(r,s)$, as necessary) as a unit area of the picture PK that is defined by a combination of a pair of neighboring coordinates r and r+1 in terms of a first coordinate axis Yk (equivalent to Yj within a definition range thereof) in a digital coordinate system Yk-Xk associated with a DMO-dependent or externally required format FK for the picture PK, such that Yk=r and Yk=r+1, and a pair of neighboring coordinates s and s+1 in terms of a second coordinate axis Xk of the coordinate system Yk-Xk, such that Xk=s and Xk=s+1; and an image data as a total duty (to be referenced by $Dk(r,s)$, as necessary) equivalent to an arithmetic sum of those fractions of duties $Dj(p,q)$ which are distributed by the DMO $Op(I \rightarrow K)$ from any and all pixels $Pj(p,q)$ of the picture PJ onto the region $Rk(r,s)$.

As a result, the pair of connected pixels $Pj(p_0,n_0)$ and $Pj(p_0+1,n_0)$ in the $n_0$-th pixel column of the picture PJ are converted into a connected region consisting of a pair of connected pixels $Pk(p_0,s_0)$ and $Pk(p_0,s_0+1)$ in a $p_0$-th pixel row and a pair of connected pixels $Pk(p_0+1,s_0)$ and $Pk(p_0+1,s_0+1)$ in a $p_0+1$-th pixel row of the picture PK.

An identical result may be obtained by employing a plurality of sequentially acting DMOs, while FIG. 4 illustrates a simplest example in which a DMO $Op(I \rightarrow L)$ operable in a row direction acts, before another DMO $Op(L \rightarrow K)$ operable in a column direction acts.

More specifically, the input picture PI is multiplied in the row direction by the DMO $Op(I \rightarrow L)$ to obtain a multiplied picture PL, so that the pixel $Pi(m_0,n_0)$ in the picture PI is converted into a pair of connected pixels $P_L(m_0,s_0)$ and $P_L(m_0,s_0+1)$ in an $m_0$-th pixel row of the picture PL.

Then, the multiplied picture PL is multiplied in the column direction by the DMO $Op(L \rightarrow K)$ to obtain an identical picture to the picture PK to be output.

The picture PL is composed of a set of imaginary pixels $P_L(t,u)$, where "t" and "u" are arbitrary integers. In the picture PL also, each pixel $P_L(t,u)$ is characterized by: a region thereof (to be referenced by $R_L(t,u)$, as necessary) as a unit area of the picture PL that is defined by a combination of a pair of neighboring coordinates t and t+1 in terms of a first coordinate axis $Y_L$ (equivalent to Yi within a definition range thereof) in a digital coordinate system $Y_{L-XL}$ associated with a format FL for the picture PL, such that $Y_L=t$ and $Y_L=t+1$, and a pair of neighboring coordinates u and u+1 in terms of a second coordinate axis $X_L$ (to be equivalent to Xk within a definition range thereof) in the digital coordinate system $Y_L$-$X_L$, such that $X_L=U$ and $X_L=u+1$; and an image data as a total duty (to be referenced by $D_L(t,u)$, as necessary) equivalent to an arithmetic sum of those fractions of duties Di(m,n) which are distributed by the DMO Op(I→L) from any and all pixels Pi(m,n) of the picture PI onto the region $R_L(t,u)$.

Accordingly, the pair of connected pixels $P_L(m_0,s_0)$ and $P_L(m_0,s_0+1)$ in the $m_0$-th pixel row of the picture PL are converted into the connected region consisting of the pair of connected pixels $Pk(p_0,s_0)$ and $Pk(p_0,s_0+1)$ in the $p_0$-th pixel row and the pair of connected pixels $Pk(p_0+1,s_0)$ and $Pk(p_0+1,s_0+1)$ in the $p_0+1$-th pixel row of the picture PK.

A single DMO or element operators thereof or two or more sequentially acting DMOs may be applied to a single-dimensional or multi-dimensional picture or a segment image thereof: directly for a multiplication of such a picture or image; inversely for a division or reproduction thereof; in combination with a format division control for an addition, convolution, deduction or flexible fraction sampling of picture or image; in combination with a direction control for a rotation, flexible mapping such as a linear or inverse mapping or waving of picture or image; in combination with a multiplication factor or element number control for an image convergence, divergence, deformation or interpolation; and in combination with an application timing control for a phase shift or delay or mobilization of picture or image, with a reduced memory capacity and an increased flexibility and in a cost-effective manner.

As will be seen from the foregoing introduction, to achieve the object described, a first genus of the present invention provides a digital picture multiplication device comprising a multiplication factor source for supplying a multiplication factor ($M_{mn}$) associated with a desired direction (Yi) of a multiplication, and a DMO operable on a first picture (PI) including a first region ($Ri(m_0,n_0)$) defined in a first digital coordinate system (Yi-Xi) associated with a first format (FI) for formatting the first picture (PI), the first digital coordinate system (Yi-Xi) having a first coordinate axis (Yi) thereof extending in a direction corresponding to the desired direction and a second coordinate axis (Xi) thereof extending in a direction different from the direction of the first coordinate axis (Yi), the first region ($Ri(m_0,n_0)$) having a first length ($m_0+1-m_0$) thereof in the direction of the first coordinate axis (Yi) of the first digital coordinate system (Yi-Xi) and a second length ($n_0+1-n_0$) thereof in the direction of the second coordinate axis (Xi) of the first digital coordinate system (Yi-Xi), the first region ($Ri(m_0, n_0)$) having a first duty ($Di(m_0,n_0)$) assigned thereto for a digital display of the first picture (PI), to generate a second picture (PJ) including a second region (Rc) defined in a second coordinate system (Yj-Xj) associated with a second format (FJ) for formatting the second picture (PJ), the second region (Rc) having a first length ($p_0+2-p_0$) thereof in a direction of a first coordinate axis (Yj) of the second digital coordinate system (Yj-Xj) and a second length ($n_0+1-n_0$) thereof in a direction of a second coordinate axis (Xj) of the second digital coordinate system (Yj-Xj), the first length ($p_0+2-p_0$) of the second region (Rc) being digitally substantially equivalent to the first length ($m_0+1-m_0$) of the first region ($Ri(m_0,n_0)$) times the multiplication factor ($M_{mn}$), the second length ($n_0+1-n_0$) of the second region (Rc) being digitally substantially equivalent to the second length ($n_0+1-n_0$) of the first region ($Ri(m_0,n_0)$), the second region (Rc) having the first duty ($Di(m_0,n_0)$) distributed thereon as a second duty ($Dj(p_0,n_0)+Dj(p_0+1,n_0)$) for a digital display of the second picture (PJ), whereas the reference characters in ( ) are provided to facilitate a comprehension of the invention, but not to intentionally modify associated phrases.

According to a species of the first genus of the invention, the first picture (PI), as it is formatted to the first format (FI), comprises a matrix of first pixels (Pi(m,n)) having a number of rows thereof each respectively definable in the first digital coordinate system (Yi-Xi) by and between Yi=m and Yi=m+1, where Yi is a variant defined on the first coordinate axis (Yi) of the first digital coordinate system (Yi-Xi) and m is an arbitrary integer within a definition range of the variant Yi, and a number of columns thereof each respectively definable in the first digital coordinate system (Yi-Xi) by and between Xi=n and Xi=n+1, where Xi is a variant defined on the second coordinate axis (Xi) of the first digital coordinate system (Yi-Xi) and n is an arbitrary integer within a definition range of the variant Xi, the matrix of first pixels (Pi(m,n)) including an arbitrary first pixel ($Pi(m_0,n_0)$) thereof composed of the first region ($Ri(m_0,n_0)$) having the first duty ($Di(m_0,n_0)$), at a row region thereof between Yi=m and Yi=m+1 in a column region thereof between Xi=n and Xi=n+1, and the second picture (PJ), as it is formatted to the second format (FI), comprises a matrix of second pixels (Pj(p,q)) having a number of rows thereof each respectively definable in the second digital coordinate system (Yj-Xj) by and between Yj=p and Yj=p+1, where Yj is a variant defined on the first coordinate axis (Yj) of the second digital coordinate system (Yj-Xj) and p is an arbitrary integer within a definition range of the variant Yj, and a number of columns thereof each respectively definable in the second digital coordinate system (Yj-Xj) by and between Xj=q and Xj=q+1, where Xj is a variant defined on the second coordinate axis (Xi) of the second digital coordinate system (Yj-Xj) and q is an arbitrary integer within a definition range of the variant Xj identical to the definition range of the variant Xi, the matrix of second pixels (Pj(p,q)) including a total of h second pixels ($Pj(p_0,n_0)+Pj(p_0+1,n_0)$) connected therebetween to be composed of the second region (Rc) having the second duty ($Dj(p_0,n_0)+Dj(p_0+1,n_0)$), at a row region thereof between Yj=p and Yj=p+h in a column region thereof between Xj=n to Xj=n+1, where h is an integer such that, letting the multiplication factor be $M_{mn}$, $h=INT[M_{mn}]$, where INT[x] is a step function that means an integer defined within a left-close right-open interval [x, x+1) of a real number variant x.

According to an individual of the species of the invention, the DMO may comprise an element DMO composed of a plurality of third regions formatted to a third format having a third digital coordinate system associated therewith, to constitute a matrix of the plurality of third regions having a number of rows thereof each respectively definable in the third digital coordinate system by and between yj=p and yj=p+1, where yj is a variant defined on a first coordinate axis of the third digital coordinate system within a definition range thereof identical to the definition range of the variant Yj, and a number of columns thereof each respectively definable in the third digital coordinate system by and between yi=m and yi=m+1, where yi is a variant defined on a second coordinate axis of the third digital coordinate system within a definition range thereof identical to the definition range of the variant Yi, the matrix of third regions including, at a row region thereof between yj=p and yj=P+h in a column region thereof between yi=m and yi=m+1, a total of h third regions thereof having distributed thereto in a one-to-one corresponding manner a total of h distribution factors substantially equivalent in a total sum thereof to a unity, and a DMO calculator operable for calculating a product between the matrix of first pixels (Pi(m, n)) and the matrix of third regions to determine the matrix of second pixels (Pj(p,q)).

According to the individual of the invention, the DMO may preferably comprise a column DMO composed of a matrix sum of a plurality of the element DMOs having the respective multiplication factors $M_{mn}$ therefor identical to a column multiplication factor equivalent to a ratio of a length of one of the number of columns of the matrix of second pixels (Pj(p, q)) between Xi=n and Xj=n+1 to a length of one of the number of columns of the matrix of first pixels (Pi(m,n)) between Xi=n and Xi=n+1 and the respective totals of h third regions thereof located in a number of different ones of the number of columns of the matrix of third regions in a one-to-one corresponding manner, and the DMO calculator being operable for calculating a product between the matrix of first pixels (Pi(m,n)) and the matrix sum of element DMOs to provide a first matrix sum of a plurality of the matrices of second pixels (Pj(p,q)) each respectively determinable from an operation by the DMO calculator between the matrix of first pixels (Pi(m,n)) and a corresponding one of the plurality of element DMOs.

Moreover, the DMO may preferably comprise a matrix DMO composed of a matrix sum of a plurality of the column DMOs having the respective column multiplication factors thereof identical to each other, and the DMO calculator being operable for calculating a product between the matrix of first pixels (Pi(m,n)) and the matrix sum of column DMOs to provide a second matrix sum of a plurality of the first matrix sums each respectively determinable from an operation by the DMO calculator between the matrix of first pixels (Pi(m,n)) and a corresponding one of the plurality of column DMOs.

Further, the matrix of first pixels (Pi(m,n)) may have the number of rows thereof equivalent to M and the number of columns thereof equivalent to N, where M and N are positive integers, respectively, the matrix of second pixels (Pj(p,q)) may have the number of rows thereof equivalent to P and the number of columns thereof equivalent to N, where P is a positive integer, and the matrix DMO may comprise a total of P×N fourth regions formatted to a fourth format having associated therewith a fourth digital coordinate system, to constitute a matrix of the total of P×N fourth regions having a total of P rows thereof each respectively definable in the fourth digital coordinate system by and between yj'=p and yj'=p+1, where yj' is a variant defined on a first coordinate axis of the fourth digital coordinate system within a definition range thereof identical to the definition range of the variant Yj, and a number of columns thereof each respectively definable in the fourth digital coordinate system by and between yi'=m and yi'=m+1, where yi' is a variant defined on a second coordinate axis of the fourth digital coordinate system within a definition range thereof identical to the definition range of the variant Yi, the matrix of fourth regions including in an arbitrary one of the total of P rows thereof a total of N fourth pixels having a total sum of the distribution factors substantially equivalent to the unity times N and in an arbitrary one of the total of N columns thereof a total of P fourth pixels having a total sum of the distribution factors substantially equivalent to the unity times P.

According to another species of the genus of the invention, the multiplication factor source may serve for detecting the first format and the second format and comparing the detected first and second formats to provide the multiplication factor ($M_{mn}$) and a set of coordinate information on the first and second digital coordinate systems (Yi-Xi, Yj-Xj).

According to an individual of this species of the invention, the digital picture multiplication device may further comprise a DMO generator responsive to the multiplication factor ($M_{mn}$) and the set of coordinate information to generate the DMO, and a DMO driver for driving the DMO into acting on the first picture PI.

According to another species of the first genus of the invention, the digital picture multiplication device may comprise the multiplication factor source operative for supplying a pair of the multiplication factors ($M_{mn}$) having the afore-mentioned desired directions thereof different from each other, and a pair (Op(I→J), Op(J→K)) of the DMOs responsive either (Op(I→J)) to one of the pair of multiplication factors to operate on the first picture (PI) to generate the second picture (PJ) and the other (Op(J→K)) to the other of the pair of multiplication factors to operate on the second picture (PJ) as the first picture thereto to generate a third picture (PK) as the second picture therefrom.

Moreover, to achieve the object, a second genus of the present invention provides a digital picture multiplication device for performing a first multiplication (I→J) of a first picture (PI) composed of a plurality (M×N) of first pixels (Pi(m,n)) including a first number (M) thereof arrayed in a first direction (Yi), the first number (M) of first pixels (Pi(m,$n_0$)) individually having a variable first image data (Di(m,$n_0$)), to provide a second picture (PJ) composed of a plurality (P×N) of second pixels (Pj(p,q)) including a second number (P) thereof arrayed in a second direction (Yj), the second number (P) of second pixels (Pj(p,$n_0$)) individually having a variable second image data (Dj(p,$n_0$)).

The digital picture multiplication device according to the second genus of the invention comprises a first associating means (FI, FJ, Op) for associating a respective one (Pi($m_0$, $n_0$)) of the first number (M) of first pixels (Pi(m,$n_0$)) with a total of h (Pi($p_0$,$n_0$), Pj($p_0$+1,$n_0$)) of the second number (P) of second pixels (Pj(p,$n_0$)), where h is a positive integer digitally equivalent to a variable first multiplication factor ($M_{mn}$) of the first multiplication (I→J), and a first distribution means (Op(I→J)) for distributing a total of h fractions (Dj($p_0$,$n_0$), Dj($p_0$+1,$n_0$)) of the first image data (Di($m_0$,$n_0$)) of the above-mentioned respective one (Pi($m_0$,$n_0$)) of the first number (M) of first pixels (Pi(m,$n_0$)) to the total of h second pixels (Pj($p_0$,$n_0$), Pj($p_0$+1,$n_0$)) associated therewith, as the respective second image data (Dj(p,$n_0$)) thereof, so that a compositional context of a first image representable by the respective first image data (Di(m,$n_0$)) of the first number (M) of first pixels (Pi(m,$n_0$)) is substantially left in a second image representable by the respective second image data (Dj(p,$n_0$)) of the second number (P) of second pixels (Pi(p, $n_0$)).

Therefore, according to the second genus of the invention, a set of first image data (Di(m,$n_0$)) assigned to a first number (M) of first pixels (Pi(m,$n_0$)) of a first picture (PI) arrayed in a first direction (Yi) have fractions (Dj($p_0$,$n_0$), Dj($p_0$+1,$n_0$)) thereof distributed to a second number (P) of second pixels (Pj(p,$n_0$)) of a second picture (PJ) arrayed in a second direction (Yj), so that a compositional context of a first image representable by the first image data (Di(m,$n_0$)) is substantially left in a second image representable by a set of second image data (Dj(p,$n_0$)) composed of the fractions of the first image data.

Accordingly, the first image that extends in the first direction (Yi) is multiplied by a variable first multiplication factor ($M_{mn}$) into the second image that extends in the second direction (Yi), thus permitting a directionally deformable multiplication (I→J) of a digital picture (PI). The first and second directions (Yi, Yj) may be coincident with each other or different from each other. Each of them may be a direction along a straight, polygonal, curved, tangential or polar axis of coordinates, or a row direction (Xi, Xj) or a column direction (Yi, Yj) of a matrix of first pixels (Pi(m,n)) or a matrix of second pixels (Pj(p,q)).

When the first multiplication factor ($M_{mn}$) is larger than a unity, a single first pixel (Pi($m_0,n_0$)) is associated with a plurality of second pixels (Pj($p_0,n_0$), Pj($p_0+1,n_0$)).

If the first multiplication factor ($M_{mn}$) is smaller than a unity, a signle second pixel (Pj($p_0,n_0$)) is associated with a plurality of first pixels (Pi($m_0,n_0$), Pi($m_0+1,n_0$)).

According to a species of the second genus of the invention, the digital picture multiplication device further performs a second multiplication (J→K) of the second picture (PJ) composed of the plurality (P×N) of second pixels (Pj(p,q)) including a third number (N) thereof arrayed in a third direction (Xj) different from the second direction (Yj), the third number (N) of second pixels (Pj($p_0,n$)) individually having a variable third image data (Dj($p_0,n$)) equivalent to the second image data (Dj($p_0,n_0$)) of a corresponding one (Pj($p_0,n_0$)) of the second pixels (Pj(p,q)), as the corresponding second pixel (Pi($p_0,n_0$)) exists, to provide a third picture (PK) composed of a plurality of third pixels (Pk(r,s)) including a fourth number (now assumed to be S) thereof arrayed in a fourth direction (Xk), the fourth number (S) of third pixels (Pk($p_0,s$)) individually having a variable fourth image data (Dk($p_0,s$)).

The digital picture multiplication device according to this species of the invention further comprises a second associating means (FJ, FK, Op) for associating a respective one (Pj($p_0,n_0$)) of the third number (N) of second pixels (Pj($p_0$, n)) with a total of k (now assumed) of the fourth number (S) of third pixels (Pk($p_0,s$)), where k is a positive integer digitally equivalent to a variable second multiplication factor (now assumed to be $M_{pk}$) of the second multiplication (J→K), and a second distribution means (Op(J→K)) for distributing a total of k fractions (Dk($p_0,s_0$), Dk($p_0,s_0+1$)) of the third image data (Dj($p_0,n_0$)) of the above-mentioned respective one (Pj($p_0,n_0$)) of the third number (N) of second pixels (Pj($p_0$, n)) to the total of k third pixels (Pk($p_0,s_0$), Pk($p_0,s_0+1$)) associated therewith, as the respective fourth image data (Dk($p_0,s$)) thereof, so that a compositional context of a third image representable by the respective third image data (Dj($p_0,n$)) of the third number (N) of second pixels (Pj($p_0,n$)) is substantially left in a fourth image representable by the respective fourth image data (Dk($p_0,s$)) of the fourth number (S) of third pixels (Dk($p_0,s$)).

This species of the invention permits a digital image processor to flexibly perform a multi-dimensionally deformable multiplication (I→J→K) of a digital picture (PI).

Further, to achieve the object, a third genus of the present invention provides a digital picture multiplication device comprising an information source means (FI, FK) for supplying information (I, K) available for an elementwise association between a total number of pixels (Pi($m_0,n_0$)) in an arbitrary first region of an input picture (PI) and a total number of pixels (Pk($r_0,s_0$)) in an arbitrary second region of an output picture (PK), and an image multiplication means (Op(L→K)) responsive to the information to automatically execute the elementwise association to thereby effect one of an image contraction and an image magnification of the first region by an arbitrary multiplication factor to provide the second region.

According to a species of the third genus of the invention, the first region may comprise an entire region of the input picture (PI) and the second region may comprise an entire region of the output picture (PK).

According to another species of the third genus of the invention, the image multiplication means (OP(L→K)) may comprise a generation means responsive to the information to generate a size conversion means for automatically executing the elementwise association in a matrix size converting manner.

Furthermore, to achieve the object, a fourth genus of the present invention provides a digital picture multiplication method comprising the steps of supplying a multiplication factor ($M_{mn}$) associated with a desired direction (Yi) of a multiplication, and executing a directional operation on a first picture (PI) including a first region (Ri($m_0,n_0$)) defined in a first digital coordinate system (Yi-Xi) associated with a first format (FI) for formatting the first picture (PI), the first digital coordinate system (Yi-Xi) having a first coordinate axis (Yi) thereof extending in a direction corresponding to the desired direction and a second coordinate axis (Xi) thereof extending in a direction different from the direction of the first coordinate axis (Yi), the first region (Ri($m_0,n_0$)) having a first length ($m_0+1-m_0$) thereof in the direction of the first coordinate axis (Yi) of the first digital coordinate system (Yi-Xi) and a second length ($n_0+1-n_0$) thereof in the direction of the second coordinate axis (Xi) of the first digital coordinate system (Yi-Xi), the first region (Ri($m_0, n_0$)) having a first duty (Di($m_0,n_0$)) assigned thereto for a digital display of the first picture (PI), to generate a second picture (PJ) including a second region (Rc) defined in a second coordinate system (Yj-Xj) associated with a second format (FJ) for formatting the second picture (PJ), the second region (Rc) having a first length ($p_0+2-p_0$) thereof in a direction of a first coordinate axis (Yj) of the second digital coordinate system (Yj-Xj) and a second length ($n_0+1-n_0$) thereof in a direction of a second coordinate axis (Xj) of the second digital coordinate system (Yj-Xj), the first length ($p_0+2-p_0$) of the second region (Rc) being digitally substantially equivalent to the first length ($m_0+1-m_0$) of the first region (Ri($m_0,n_0$)) times the multiplication factor ($M_{mn}$), the second length ($n_0+1-n_0$) of the second region (Rc) being digitally substantially equivalent to the second length ($n_0+1-n_0$) of the first region (Ri($m_0,n_0$)), the second region (Rc) having the first duty (Di($m_0,n_0$)) distributed thereon as a second duty (Dj($p_0,n_0$)+Dj($p_0+1,n_0$)) for a digital display of the second picture (PJ).

Still more, to achieve the object, a fifth genus of the present invention provides a digital picture multiplication method for performing a first multiplication (I→J) of a first picture (PI) composed of a plurality (M×N) of first pixels (Pi(m,n)) including a first number (M) thereof arrayed in a first direction (Yi), the first number (M) of first pixels (Pi(m,$n_0$)) individually having a variable first image data (Di(m,$n_0$)), to provide a second picture (PJ) composed of a plurality (P×N) of second pixels (Pj(p,q)) including a second number (P) thereof arrayed in a second direction (Yj), the second number (P) of second pixels (Pj(p,$n_0$)) individually having a variable second image data (Dj(p,$n_0$)).

The digital picture multiplication method according to the fourth genus of the invention comprises the steps of associating a respective one (Pi($m_0,n_0$)) of the first number (M) of first pixels (Pi(m,$n_0$)) with a total of h (Pj($p_0,n_0$), Pj($p_0+1,n_0$)) of the second number (P) of second pixels (Pj(p,$n_0$)), where h is a positive integer digitally equivalent to a variable first multiplication factor ($M_{mn}$) of the first multiplication (I→J), and distributing a total of h fractions (Dj($p_0,n_0$), $Dj(p_0+1,n_0))$ of the first image data $(Di(m_0,n_0))$ of the above-mentioned respective one $(Pi(m_0,n_0))$ of the first number (M) of first pixels $(Pi(m,n_0))$ to the total of h second pixels $(Pj(p_0,n_0), Pj(p_0+1,n_0))$ associated therewith, as the respective second image data $(Dj(p,n_0))$ thereof, so that a compositional context of a first image representable by the respective first image data $(Di(m,n_0))$ of the first number (M) of first pixels $(Pi(m,n_0))$ is substantially left in a second image representable by the respective second image data $(Dj(p,n_0))$ of the second number (P) of second pixels $(Pi(p,n_0))$.

BRIEF DESCRIPTION OF THE DRAWINGS

The objects, features and advantages of the present invention will become more apparent from consideration of the following detailed description, in conjunction with the accompanying drawings, in which:

FIGS. 1A, 1B and 1C are illustrations for describing a principle of a conventional projection concept for multiplying a digital picture;

FIG. 2 is a diagram of a pixel matrix of an input picture overlapping a pixel matrix of an output picture, for describing a conventional geometrical mode conversion;

FIG. 4 is an illustration for describing an application of the directional multiplication concept to a multi-dimensional multiplication, in which a number of directional multiplication operators are combined in accordance with the invention;

FIG. 5C is an illustration for describing an internal structure and an operation of a column operator constituting the directional multiplication operator of FIG. 3B;

FIG. 5D is an illustration for describing an internal structure and an operation of a column-wise acting matrix operator constituting the directional multiplication operator of FIG. 3B;

FIG. 6 shows an example of a sequence of steps for generating an exemplary matrix operator in accordance with the invention;

FIG. 8 is an illustration for describing an internal structure and an operation of a row-wise acting matrix operator constituting one of the directional multiplication operators of FIG. 4;

FIGS. 9A to 9E are illustrations for describing various applications of the directional multiplication concept according to the invention.

DESCRIPTION OF THE PREFERRED EMBODIMENTS

Figure 3A:
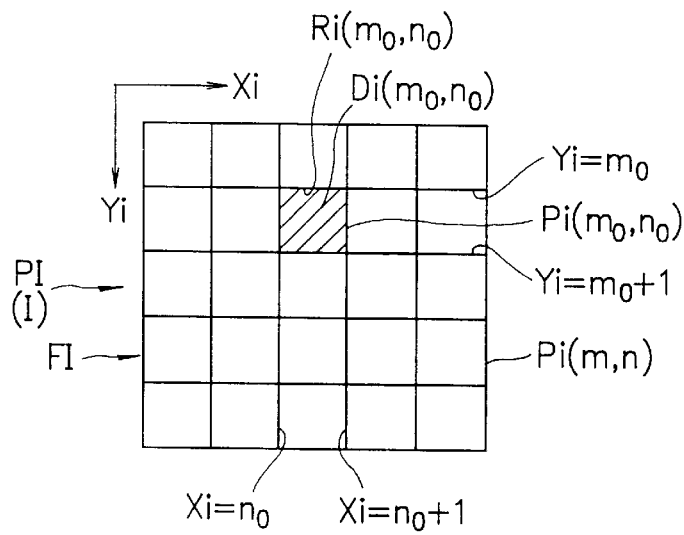
FIGS. 3A, 3B and 3C are illustrations for describing a principle of a directional multiplication concept employing a single directional multiplication operator according to the invention.

There will be detailed below preferred embodiments of the present invention, with reference to FIGS. 3A–3C to 10. Like members are designated by like reference characters.

Figure 3B:
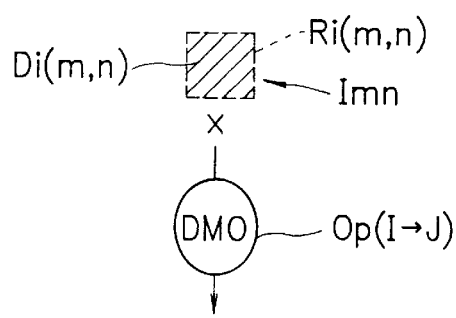
Figure 3C:
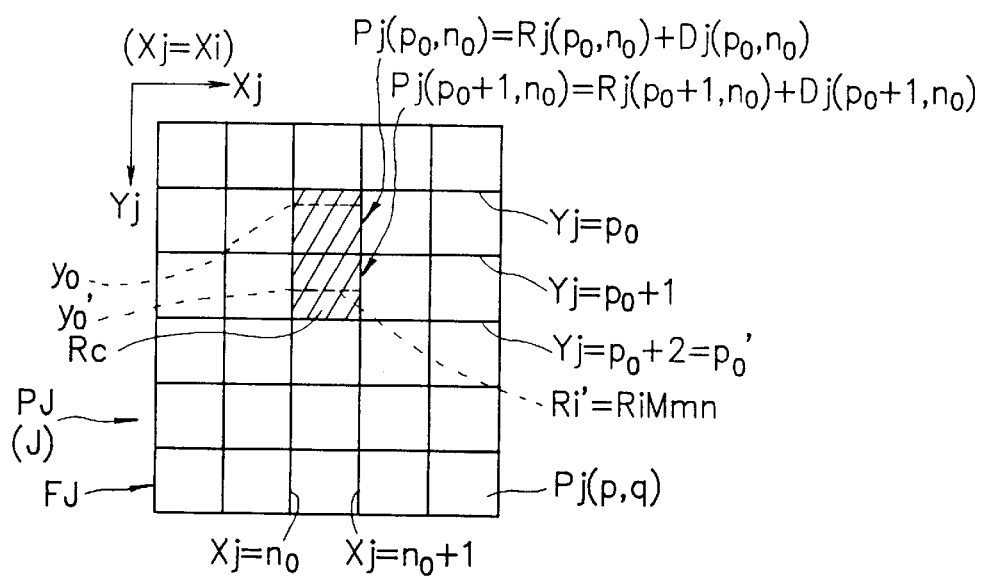

FIGS. 3A to 3C illustrate a principle of a directional multiplication concept, by showing a digital picture multiplication device according to an embodiment of the invention.

The digital picture multiplication device comprises an unshown multiplication factor source for supplying the multiplication factor $M_{mn}$ which is associated with a desired direction of the illustrated multiplication, i.e., a direction associated with the axis Yi, and the DMO operable on the first picture PI.

The first picture PI includes the first region $Ri(m_0,n_0)$ that is defined in the first digital coordinate system Yi-Xi associated with the first format FI for formatting the first picture (PI). The first digital coordinate system Yi-Xi has the first coordinate axis Yi extending in a direction corresponding to the desired direction and the second coordinate axis Xi extending in a direction different from the direction of the first coordinate axis Yi.

The first region $Ri(m_0,n_0)$ has a first length $m_0+1-m_0$ thereof in the direction of the first coordinate axis Yi and a second length $n_0+1-n_0$ in the direction of the second coordinate axis Xi.

The first region $Ri(m_0,n_0)$ has a first duty $Di(m_0,n_0)$ assigned thereto for a digital display of the first picture PI.

The operation by the DMO generates the second picture PJ that includes the second region Rc which is defined in the second coordinate system Yi-Xi associated with the second format FJ for formatting the second picture PJ.

The second region Rc has a first length $p_0+2-p_0$ in a direction of the first coordinate axis Yj of the second digital coordinate system Yj-Xj and a second length $n_0+1-n_0$ in a direction of the second coordinate axis Xj of the second digital coordinate system Yj-Xj.

The first length $p_0+2-p_0$ of the second region Rc is digitally substantially equivalent to the first length $m_0+1-m_0$ of the first region $Ri(m_0,n_0)$ times the multiplication factor $M_{mn}$. The second length $n_0+1-n_0$ of the second region Rc is digitally substantially equivalent to the second length $n_0+1-n_0$ of the first region $Ri(m_0,n_0)$.

The second region Rc has the first duty $Di(m_0,n_0)$ of the first region $Ri(m_0,n_0)$ distributed thereon as a second duty $Dj(p_0,n_0)+Dj(p_0+1,n_0))$ for a digital display of the second picture PJ.

The first picture is formatted to the first format FI so that it comprises the matrix I of first pixels Pi(m,n), which has a total of M rows each respectively definable in the first digital coordinate system Yi-Xi by and between Yi=m and Yi=m+1, where M is a positive integer, Yi is a variant defined on the first coordinate axis Yi and m is defined as an integer within a definition range of the variant Yi, and a total of N columns each respectively definable in the first digital coordinate system Yi-Xi by and between Xi=n and Xi=n+1, where N is a positive integer, Xi is a variant defined on the second coordinate axis Xi and n is defined as an integer within a definition range of the variant Xi.

The matrix of first pixels Pi(m,n) includes as an arbitrary first pixel $(Pi(m_0,n_0))$ thereof a combination of the first region $Pi(m_0,n_0)$ and the first duty $(Di(m_0,n_0))$, at a row region between Yi=m and Yi=m+1 in a column thereof between Xi=n and Xi=n+1.

The second picture PJ is formatted to the second format FJ so that it comprises the matrix J of second pixels Pj(p,q), which has a total of P rows each respectively definable in the second digital coordinate system Yj-Xj by and between Yj=p and Yj=p+1, where P is a positive integer, Yj is a variant defined on the first coordinate axis Yj and p is defined as an integer within a definition range of the variant Yj, and a total of N columns each respectively definable in the second digital coordinate system Yj-Xj by and between Xj=q and Xj=q+1, where Xj is a variant defined on the second coordinate axis Xi and q is defined as an integer within a definition range of the variant Xj that is identical to the definition range of the variant Xi.

The matrix of second pixels Pj(p,q) includes a total of h (=2 in this case) second pixels $Pj(p_0,n_0)$ and $Pj(p_0+1,n_0)$ connected therebetween to be composed of the second region Rc having the second duty $Dj(p_0,n_0)+Dj(p_0+1,n_0)$, at a row region between Yj=p and Yj=p+h in a column thereof between Xj=n to Xj=n+1, where h is an integer such that $h=INT[M_{mn}]$.

Figure 5A:
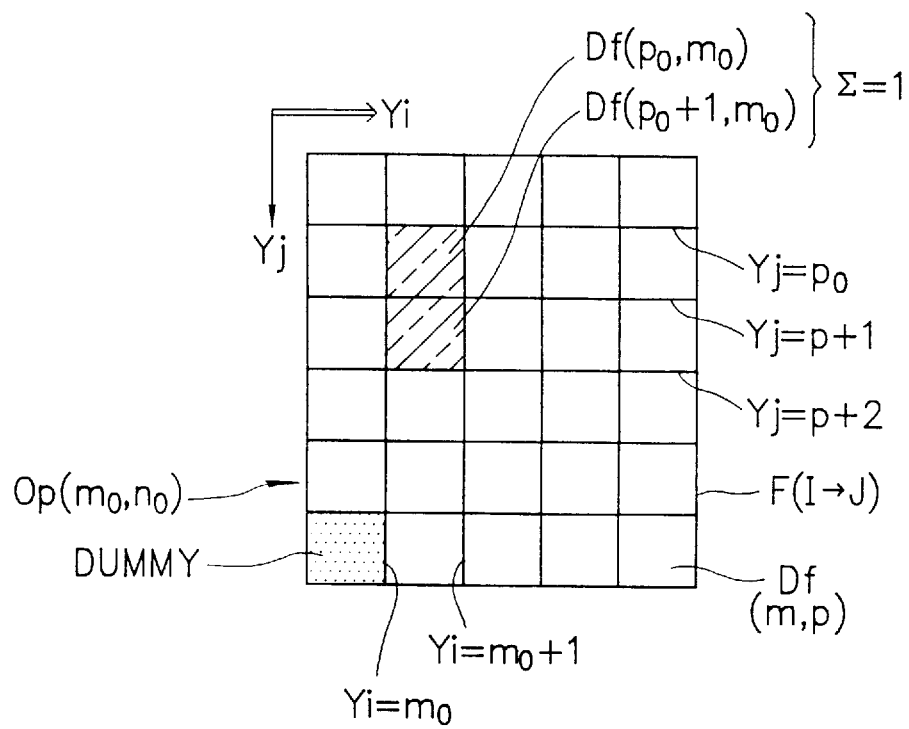
FIGS. 5A and 5B are illustrations for describing an internal structure of an element operator constituting the directional multiplication operator of FIG. 3B.

FIG. 5A illustrates an internal structure of the DMO Op(O→J).

In FIG. 5A, the DMO Op(I→J) comprises an element operator $Op(m_0,n_0)$ composed of a total of P×M weighted third regions formatted as a matrix to a third format F(I→J) that has a third digital coordinate system Yj-Yi associated therewith, and an unshown DMO calculator operable for calculating a product between the matrix of first pixels Pi(m, n) and the matrix of third regions to determine the matrix of second pixels Pj(p,q).

The third digital coordinate system system Yj-Yi has as a first coordinate axis thereof the first coordinate axis Yj of the second digital coordinate system Yj-Xj and as a second coordinate axis thereof the first coordinate axis Yi of the first digital coordinate system Yi-Xi.

The first coordinate axis of the third digital coordinate system may be an arbitrary digital coordinate axis having a variant (yj) defined thereon within a definition range thereof identical to the definition of the variant Yj on the first coordinate axis Yj of the second digital coordinate system Yj-Xj. Likewise, the second coordinate axis of the third digital coordinate system may be an arbitrary digital coordinate axis having a variant (yi) defined thereon within a definition range thereof identical to the definition of the variant Yi on the first coordinate axis Yi of the first digital coordinate system Yi-Xi.

The matrix of third regions has a total of P rows each respectively definable in the third digital coordinate system Yj-Yi by and between Yj=p and Yj=p+1, and a total of M columns each respectively definable in the third digital coordinate system Yj-Yi by and between Yi=m and Yi=m+1.

In the element operator $Op(m_0,n_0)$, the matrix of third regions includes, at a row region thereof between $Yi=p_0$ and $Yj=p_0+h$ in a column region thereof between $Yi=m_0$ and $Yi=m_0+1$, a total of h third regions that have distributed thereto in a one-to-one corresponding manner a total of h distribution factors $Df(p_0,m_0)$ and $Df(p_0+1,m_0)$ substantially equivalent in a total sum to a unity, so that the element operator $Op(m_0,n_0)$ is selectively operable to the first pixel $Pi(m_0,n_0)$ for a directional multiplication thereof.

The matrix of third regions may include a dummy region employed to have a complete matrix form when an input picture or a picture to be output is composed of a deformed or irregular matrix of pixels.

Figure 5B:
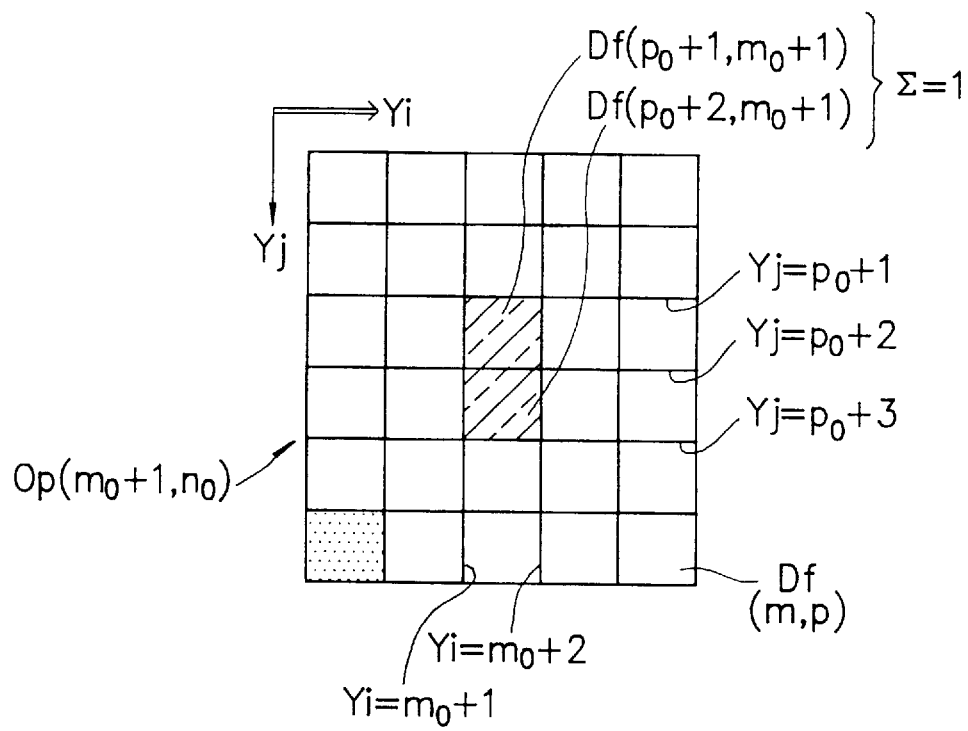

FIG. 5B illustrates an internal structure of another element operator $Op(m+1_0,n_0)$ in the DMO Op(I→J) that is selectively operable to a first pixel $Pi(m_0+1,n_0)$ neighboring the first pixel $Pi(m_0,n_0)$ in the same column of the matrix of first pixels Pi(m,n).

The element operator $Op(m_0+1,n_0)$ also comprises a total of P×M weighted third regions formatted as a matrix to the third format F(I→J). The DMO calculator is commonly used for a product between the matrix of first pixels Pi(m,n) and the matrix of third regions.

In the element operator $Op(m_0+1,n_0)$, the matrix of third regions includes, at a row region between $Yj=p_0+k$ (k=1 in this case) and $Yj=p_0+k+h$ in a column region between $Yi=m_0+1$ and $Yi=m_0+1+1$, a total of h third regions that have distributed thereto in a one-to-one corresponding manner a total of h distribution factors $Df(p_0+1,m_0+1)$ and $Df(p_0+2,m_0+1)$ substantially equivalent in a total sum to a unity, where k is an integer that depends on the third format F(I→J), or more specifically, on the row and column numbers of the matrix of third regions.

The DMO Op(I→J) comprises a total of M×N element operators Op(m,n) operable on the first picture PI, element-wise selectively or in combination.

FIG. 5C illustrates an internal structure and an operation of a column operator $Op(n_0)$ in the DMO Op(I→J), which operator $Op(n_0)$ is selectively operable to an $n_0$-th column of the matrix of first pixels Pi(n, m).

The column operator $Op(n_0)$ is composed of a matrix sum of a total of M element operators $Op(m,n_0)$ having their multiplication factors $M_{mn}$ occasionally identical to a column multiplication factor $M_n$ which is equivalent to P/M, i.e., to a ratio of a length (P) of an $n_0$-th column of the matrix of second pixels (Pj(p,q)) between $Xj=n_0$ and $Xj=n_0+1$ to a length (M) of the $n_0$-th column the matrix of first pixels (Pi(m,n)) between $Xi=n_0$ and $Xi=n_0+1$. The M element operators $Op(m,n_0)$ have their respective totals of h third regions located in N different columns of the matrix of third regions in a one-to-one corresponding manner.

In the DMO Op(I→J) of FIG. 5C, the DMO calculator is operable for calculating a product between the matrix of first pixels Pi(m,n) and the matrix sum of element DMOs to provide a matrix sum of M matrices of second pixels Pj(p,q), which M matrices are each respectively determinable from an operation by the DMO calculator between the matrix of first pixels Pi(m,n) and a corresponding one of the M element operators $Op(m,n_0)$.

In the column operator $Op(n_0)$, the matrix of third regions has in each of the M columns the h distribution factors Df of which a total sum equals a unity, so that a total sum of the factors Df in the matrix amounts to the unity times M. Accordingly, letting the unity be 1, the matrix may have in each of the P rows a total of distribution factors Df equivalent to M/P in average.

The $n_0$-th column of the matrix of first pixels Pi(m,n) comprises a column region equivalent to a sum of M pixel regions $Ri(m,n_0)$, and M discrete duties $Di(m,n_0)$.

As a result, the matrix sum of M matrices of second pixels (Pj(p,q)) has in an $n_0$-th column thereof a column region equivalent to the sum of M pixel regions $Ri(m,n_0)$ times the column multiplication factor $M_n$, and P discrete duties of which a total equals a total of fractions of the M duties $Di(m,n_0)$, as they are distributed.

The DMO Op(I→J) comprises a total of N column operators Op(n) operable on the first picture PI, column-wise selectively or in combination.

FIG. 5D illustrates an internal structure and an operation of a matrix operator Op(I) as a body of the DMO Op(I→J) in this case.

The matrix operator Op(I) is composed of a matrix sum of a total of N column operators Op(n) having their column multiplication factors $M_n$ occasionally identical to a matrix multiplication factor MI which is equivalent to P/M. The N column operators Op(n) have their respective totals of M×h third regions distributed in the M columns of the matrix of third regions.

In the DMO Op(I→J) of FIG. 5D, the DMO calculator is operable for calculating a product between the matrix of first pixels Pi(m,n) and the matrix sum of N column operators to provide a matrix sum of N matrices of second pixels Pj(p,q), which N matrices are each respectively determinable from an operation by the DMO calculator between the matrix of first pixels Pi(m,n) and a corresponding one of the N column operators Op(n).

In the matrix operator Op(I), the matrix of third regions has in each of the M columns the N×h distribution factors Df of which a total sum equals a unity times N, so that a total sum of the factors Df in the matrix amounts to the unity times N×M. Accordingly, letting the unity be 1, the matrix may have in each of the P rows a total of distribution factors Df equivalent to N×M/P in average.

The $n_0$-th column of the matrix of first pixels Pi(m,n) comprises the column region equivalent to the sum of M pixel regions Ri(m,$n_0$), and the M discrete duties Di(m,$n_0$), as described.

As a result, the matrix sum of N matrices of second pixels Pj(p,q) has in an $n_0$-th column thereof a column region equivalent to the sum of M pixel regions Ri(m,$n_0$) times the matrix multiplication factor P/M (=$M_n$), and P discrete duties of which a total equals a total of fractions of M×N duties Di(m,n), as they are distributed, which may be normalized simply by dividing N in a case to determine a set of image data in a column-wise multiplied picture.

In a preferable case, the DMO Op(I→J) may comprise a plurality of matrix operators operable on the first picture PI and a multiplied picture, selectively or in combination.

For the matrix operator Op(I), the distribution of element-wise integrated distribution factors Df is computable in a simplified manner.

Figure 7:
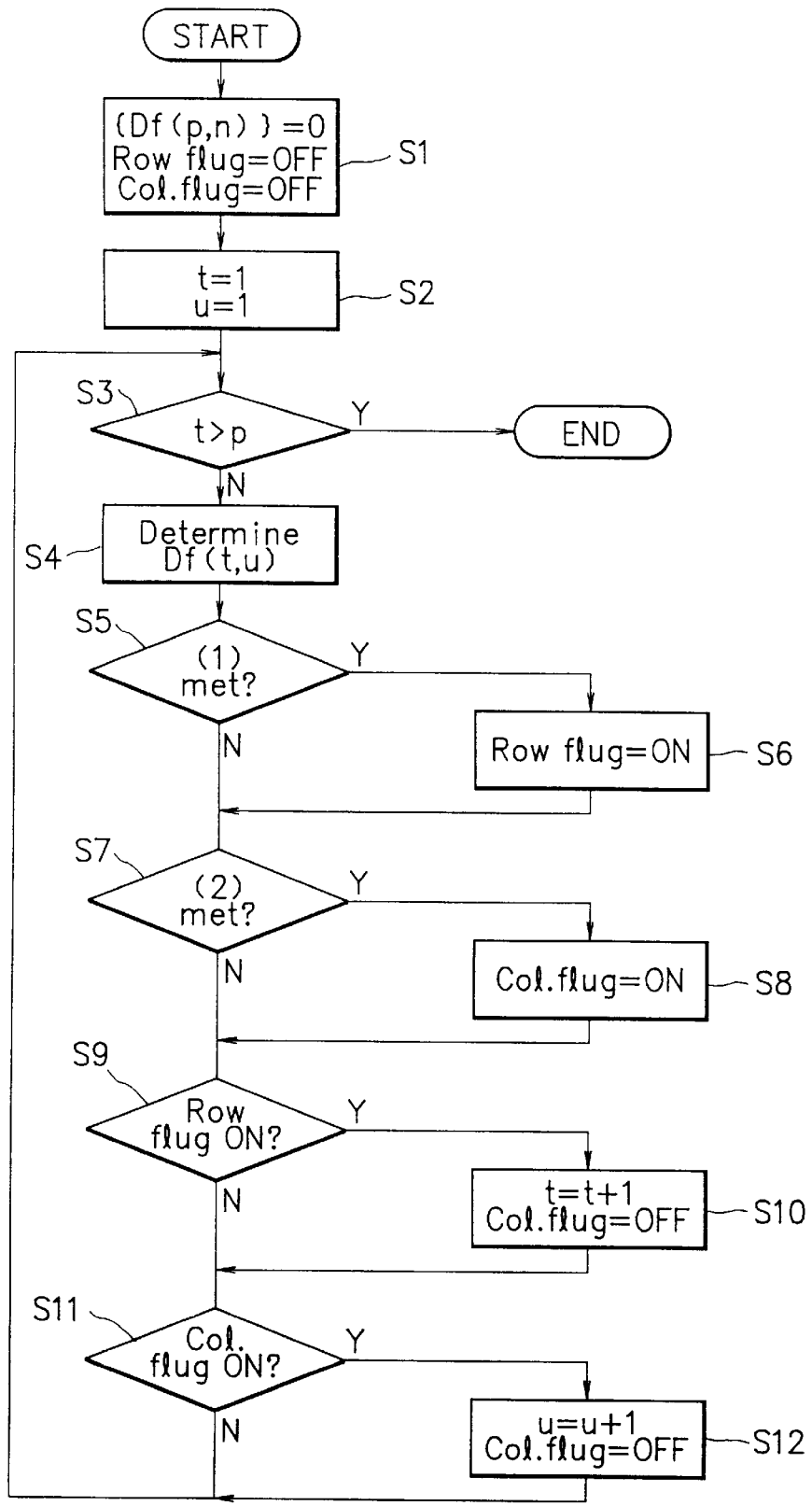
FIG. 7 is a flow chart of a generalized program for generating a matrix operator according to the invention.

FIG. 6 shows an example of a sequence of steps for computing a distribution pattern of integrated distribution factors Df to thereby generate an exemplary matrix operator of a 5-row×4-column size, and FIG. 7 shows a flow chart of a generalized program applicable to the computation of FIG. 6.

In FIG. 7, at a step S1, all distribution factors Df(p,n) in the matrix of third regions of Op(I) are set to a null. A row flog and a column flug both have an OFF state.

At a step S2, a row number parameter t representative of a current row and a column number parameter u representative of a current column are both set to 1, before the flow enters a cyclic process to element-wise determine a distribution factor Df(t,u) as the Df(p,n).

The steps S1 and S2 provides a result shown at ① in FIG. 6.

At a step S3, a decision is made as to whether t>p.

If the current row has a larger number t than a P-th row at a bottom of the matrix of third regions, no additional computation is required, so the flow goes to an end.

When the current row number t is equal to or smaller than the bottom row number P, the flow goes to a subsequent step S4, where a Df(t,u) at a current position (t,u) in the matrix of third regions is uniquely determined to be a maximum integer meeting a first basic condition such that:

$$\Sigma_n[Df(p,n)]_{p=t(const)} \leq N,$$

and a second basic condition such that:

$$\Sigma_p[Df(p,n)]_{n=u(const)} \leq P.$$

In the case of FIG. 6, Df(1,1)=4 as shown at ②.

Then, the flow enters a step S5, where another decision is made as to whether the determined Df(t,u) meets a condition (1) such that:

$$\Sigma_n[Df(p,n)]_{p=t(const)} = N \tag{1}.$$

When the condition (1) is met, the flow goes via a step S6, where the row flug is set to an ON state, to a subsequent step S7. If the condition (1) is not met, the flow directly goes to the step S7.

In the case of ② in FIG. 6, the condition (1) is met, so the column flug is set to the ON state.

At the step S7, another decision is made as to whether the determined Df(t,u) meets a condition (2) such that:

$$\Sigma_p[Df(p,n)]_{n=u(const)} = P \tag{2}.$$

When the condition (2) is met, the flow goes via a step S8, where the column flug is set to an ON state, to a subsequent step S9. If the condition (2) is not met, the flow directly goes to the step S9.

In the case of ② in FIG. 6, the condition (2) is not met, so the column flug remains at the OfF state.

At the step S9, another decision is made as to whether the row flug is ON.

When the row flug is ON, the flow goes via a step S10, where the row number parameter t in incremented to t+1 and the row flug is reset to OFF, to a subsequent step S11. If the row flug is OFF at the step S9, the flow directly goes to the step S11.

In the case of ② in FIG. 6, the row flug is ON at the step S7, so the current row number (t=1) is incremented (to t=2).

At the step S11, another decision is made as to whether the column flug is ON.

When the column flug is ON, the flow goes via a step S12, where the column number parameter u in incremented to u+1 and the column flug is reset to OFF, to the cycle start step S3. If the column flug is OFF at the step S11, the flow directly goes to the step S3.

In the case of ② in FIG. 6, the column flug is OFF at the step S11, so the current column number (u=1) is left as it was (u=1).

Thus, in FIG. 6, a current position (2,1) is emphasized at ②.

Like steps are repeated along with the flow chart of FIG. 7, so the 5×4 third regions of FIG. 6 has sequentially determined Df values, as shown at ③ to ⑨.

The foregoing description is directed to a column-wise multiplication. It will however be seen that a similar description is applicable to a row-wise multiplication, subject to a well-known alternative direction of operation to determine a product of matrices.

FIG. 8 illustrates an internal structure and an operation of a matrix operator Op(J) as a body of the DMO Op(J→K) of FIG. 4.

The matrix operator Op(J) is composed of a matrix sum of a total of P row operators Op(p) each respectively consisting of a total of Q (=N) element operators Op(p,q) operable in a row or Xj direction of the matrix of second pixels Pj(p,q).

The P row operators have their row multiplication factors $M_p$ occasionally identical to a matrix multiplication factor MJ which is equivalent to S/Q, where S=max (s), and their respective totals of Q×k fourth regions distributed in Q rows of a matrix of Q×S weighted regions which is identical to the matrix sum Op(J) of P row operators Op(p), where k=INT [$M_p$].

The DMO Op(J=K) also has a DMO calculator operable for calculating a product between the matrix of second pixels Pj(p,q) and the matrix sum of P row operators Op(p) to provide a matrix sum of P matrices of pixels Pk(r,s), which P matrices are each respectively determinable from an operation by the DMO calculator between the matrix of pixels Pj(p,q) and a corresponding one of the P row operators Op(p).

In the matrix operator Op(J), the matrix of its regions has in each of Q rows thereof the Q×k distribution factors Df of which a total sum equals a unity times P, so that a total sum of the factors Df in the matrix amounts to the unity times P×Q. Accordingly, letting the unity be 1, the matrix may have in each of S columns thereof a total of distribution factors Df equivalent to P×Q/S in average.

A $p_0$-th row of the matrix of second pixels Pj(p,q) comprises a row region equivalent to a sum of Q pixel regions Rj($p_0$,q), and a total of Q discrete duties Dj($p_0$,q).

As a result, the matrix sum of P matrices of pixels Pk(r,s) has in a $P_0$-th row thereof a row region equivalent to the sum of Q pixel regions Rj($p_0$,q) times the matrix multiplication factor S/P (=$M_p$), and S discrete duties of which a total equals a total of fractions of P×Q duties Dj(p,q), as they are distributed, which may be normalized simply by dividing P in a case to determine a set of image data in a row-wise multiplied picture.

FIGS. 9A to 9E are illustrations for describing various applications of the directional multiplication concept according to the invention.

FIG. 9A shows an input picture including a pixel defined by Y1=y1 and Y1=yi+1 and by X1=x1 and X1=x1+1 in an associated digital coordinate system Y1-X1. The pixel (y1, x1) has a region of a unit area.

FIGS. 9B to 9E each show a modified element DMO column-wise operable on the input picture, to act on the pixel (y1, x1). Broken lines enclose a region defined by a length thereof in a column direction, which is equivalent to a column-wise length of the pixel (y1, x1) times a multiplication factor and and a length thereof in a row direction, which is equivalent to a row-wise length of the pixel (y1, x1).

In FIG. 9B, a DMO matrix defined in a digital coordinate system Y2-X2 has a unit region thereof defined by Y2=y2 and Y2=y2+2 and by X2=x2 and X2=x2+1.

In FIG. 9C, a DMO matrix defined in a digital coordinate system Y3-X3 has a unit region thereof defined by Y3=y3 and Y3=y3+3 and by X3=x2 and X2=x2+2.

In FIG. 9D, a DMO matrix defined in a digital coordinate system Y4-X4 has a unit region thereof defined by Y4=y4 and Y4=y4+2 and by X4=x4 and X4=x4+2.

In FIG. 9E, a DMO matrix defined in a curvilinear digital coordinate system W1-W2 has a unit region thereof defined by W1=w1 and W1=w1+2 and by W2=w2 and W2=w2+1.

In a particular case in which an available memory capacity is relatively small, such modifications are effective.

Figure 10:
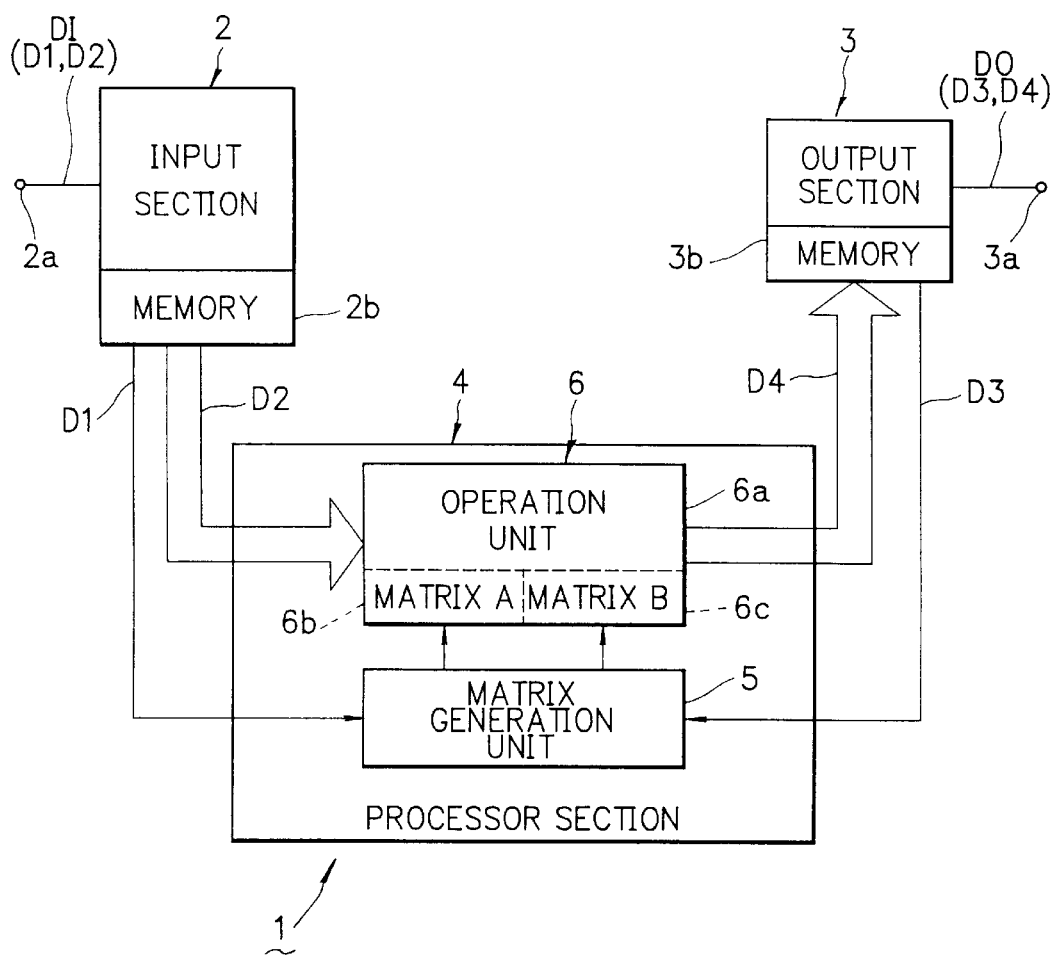
FIG. 10 is a block diagram of an entirety of a digital picture multiplication device according to an embodiment of the invention.

FIG. 10 is a block diagram of an entirety of a digital picture multiplication device according to an embodiment of the invention.

In FIG. 10, designated at reference character 1 is the digital picture multiplication device. The multiplication device 1 comprises an input section 2, an output section 3, and a processor section 4 composed of a matrix generation unit 5 and an operation unit 6.

The input section 2 inputs via an input connection 2a thereof a digital signal DI consisting of a set of signal format data D1 and a set D2 of digital image data Di(m,n) cooperative with the format data D1 to display an input picture PI which is composed of an M×N matrix I of pixels Pi(m,n).

The format data D1 and/or the image data D2 may be stored in blocks of a memory 2b in the input section 2. The memory 2b may be omitted.

The output section 3 outputs via an output connection 3a thereof a digital signal DO consisting of a set of signal format data D3 and a set D4 of digital image data Dk(r,s) cooperative with the format data D3 to display an output picture PK which is composed of an R×S matrix K of pixels Pk(r,s).

The format data D3 and/or the image data D4 may be stored in blocks of a memory 3b in the output section 3. The format data D3 may be supplied to the output section 3 via an unshown connection thereof. The memory 3b may be omitted.

The processor section 4 is provided with an unshown central processing unit (hereafter "CPU") connected to respective units and memories in the multiplication device 1.

The matrix generation unit 5 generates a column-wise operable matrix operator Op(I) and a row-wise operable matrix operator Op(J), by using the format data D1 and D2. The operators Op(I) and Op(J) are supplied to the operation unit 6, as element-weighted matrices A and B, respectively.

The operation unit 6 includes a DMO calculator 6a for a column-wise operation and another DMO calculator 6b for a row-wise operation.

The calculator 6a acts on the operator Op(I) to generate a product of the matrices A and I to provide a column-wise multiplied picture PJ composed of a matrix J of imaginary pixels Pj(p,q).

The calculator 6b acts on the operator Op(J) to generate a product of the matrices J and B to provide a row-wise multiplied picture as the picture PK.

In other words, PK=A·I·B, where the operation element "·" acts for a matrix product.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A digital picture multiplication device comprising:

a multiplication factor source for supplying a multiplication factor associated with a desired direction of a multiplication by said digital picture multiplication device;

directional multiplication operator means operable on a first picture including a first region defined in a first digital coordinate system associated with a first format for formatting said first picture, said first digital coordinate system having a first coordinate axis thereof extending in a direction corresponding to said desired direction and a second coordinate axis thereof extending in a direction different from said direction of said first coordinate axis, said first region having a first length thereof in said direction of said first coordinate axis of said first digital coordinate system and a second length thereof in said direction of said second coordinate axis of said first digital coordinate system, said first region having a first duty assigned thereto for a digital display of said first picture, to generate a second picture including a second region defined in a second coordinate system associated with a second format for formatting said second picture, said second region having a first length thereof in a direction of a first coordinate axis of said second digital coordinate system and a second length thereof in a direction of a second coordinate axis of said second digital coordinate system, said first length of said second region being digitally substantially equivalent to said first length of said first region times said multiplication factor, said second length of said second region being digitally substantially equivalent to said second length of said first region, said second region having said first duty distributed thereon as a second duty for a digital display of said second picture;

said first picture, as it is formatted to said first format, comprising a matrix of first pixels having a number of rows thereof, each being respectively definable in said first digital coordinate system by and between Yi=m and Yi=m+1, where Yi is a variant defined n said first coordinate axis of said first digital coordinate system and m is an arbitrary integer within a definition range of said variant Yi, and a number of columns thereof, each being respectively definable in said first digital coordinate system by and between Xi=n and Xi=n+1, where Xi is a variant defined on said second coordinate axis of said first digital coordinate system and n is an arbitrary integer within a definition range of said variant Xi, said matrix of first pixels including an arbitrary first pixel thereof composed of said first region having said first duty, at a row region thereof between Yi=m and Yi=m+1 in a column region thereof between Xi=n and Xi=n+1;

said second picture, as it is formatted to said second format, comprising a matrix of second pixels having a number of rows thereof, each respectively definable in said second digital coordinate system by and between Yj=p and Yj=p+1, where Yj is a variant defined on said first coordinate axis of said second digital coordinate system and p is an arbitrary integer with a definition range of said variant Yj, and a number of columns thereof, each being respectively definable in said second digital coordinate system by and between Xj=q and Xj=q+1, Xj is a variant defined on said coordinate axis of said second digital coordinate system and q is an arbitrary integer within a definition range of said variant Xj identical to said definition range of said variant Xi, said matrix of second pixels including a total of h second pixels connected therebetween to be composed of said second region having said second duty, at a row region thereof between Yj=p and Yj=p+h in a column region thereof between Xj=n to Xj=n+1, where h is an integer such that, letting said multiplication factor be $M_{mn}$, h=INT[$M_{mn}$], where INT[x] is a step function that means an integer defined within an interval of a real number variant x;

wherein said directional multiplication operator means comprises:

an element operator composed of a plurality of third regions formatted to a third format having a third digital coordinate system associated therewith, to constitute a matrix of said plurality of third regions having a number of rows thereof, each being respectively definable in said third digital coordinate system by and between yj=p and yj=p+1, where yj is a variant defined on a first coordinate axis of said third digital coordinate system within a definition range thereof identical to said definition range of said Yj, and a number of columns thereof each respectively definable in said third digital coordinate system by and between yi=m and yi=m+1, where yi is a variant defined on a second coordinate axis of said third digital coordinate system within a definition range thereof identical to said definition range of said variant Yi, said matrix of third regions including, at a row region thereof between yj=p and yj=p+h in a column region thereof between yi=m and yi=m+1, a total of h third regions thereof having distributed thereto in a one-to-one corresponding manner a total of h distribution factors substantially equivalent in a total sum thereof to a unity; and a multiplication calculator operable for calculating a product between said matrix of first pixels and said matrix of third regions to determine said matrix of second pixels.

2. A digital picture multiplication device according to claim 1, wherein said directional multiplication operator means comprises:

a column operator composed of a matrix sum of a plurality of said element operators having said respective multiplication factors $M_{mn}$ therefor identical to a column multiplication factor equivalent to a ratio of a length of one of said number of columns of said matrix of second pixels between Xj=n and Xj=n+1 to a length of one of said number of columns of said matrix of first pixels between Xi=n and Xi=n+1 and said respective totals of h third regions thereof located in a number of different ones of said number of columns of said matrix of third regions in a one-to-one corresponding manner; and said multiplication calculator being operable for calculating a product between said matrix of first pixels and said matrix sum of element operators to provide a first matrix sum of a plurality of said matrices of second pixels each respectively determinable from an operation by said multiplication calculator between said matrix of first pixels and a corresponding one of said plurality of element operators.

3. A digital picture multiplication device according to claim 2, wherein said directional multiplication operator means comprises:

a matrix operator composed of a matrix sum of a plurality of said column operators having said respective column multiplication factors thereof identical to each other; and said multiplication calculator being operable for calculating a product between said matrix of first pixels and said matrix sum of column operators to provide a second matrix sum of a plurality of said first matrix sums each respectively determinable from an operation by said multiplication calculator between said matrix of first pixels and a corresponding one of said plurality of column operators.

4. A digital picture multiplication device according to claim 3, wherein said matrix of first pixels has said number of rows thereof equivalent to M and said number of columns thereof equivalent to N, where M and N are positive integers, respectively, wherein said matrix of second pixels has said number of rows thereof equivalent to P and said number of columns thereof equivalent to N, where P is a positive integer, and wherein said matrix operator comprises a total of P×N fourth regions formatted to a fourth format having associated therewith a fourth digital coordinate system, to constitute a matrix of said total of P×N fourth regions having a total of P rows thereof each respectively definable in said fourth digital coordinate system by and between yj'=p and yj'=p+1, where yj' is a variant defined on a first coordinate axis of said fourth digital coordinate system within a definition range thereof identical to said definition range of said variant Yj, and a number of columns thereof each respectively definable in said fourth digital coordinate system by and between yi'=m and yi'=m+1, where yi' is a variant defined on a second coordinate axis of said fourth digital coordinate system within a definition range thereof identical to said definition range of said variant Yi, said matrix of fourth regions including in an arbitrary one of said total of P rows thereof a total of N fourth pixels having a total sum of said distribution factors substantially equivalent to said unity times N and in an arbitrary one of said total of N columns thereof a total of P fourth pixels having a total sum of said distribution factors substantially equivalent to said unity times P.

5. A digital picture multiplication device comprising:

a multiplication factor source for supplying a multiplication factor associated with a desired direction of a multiplication by said digital picture multiplication device; and directional multiplication operator means operable on a first picture including a first region defined in a first digital coordinate system associated with a first format for formatting said first picture, said first digital coordinate system having a first coordinate axis thereof extending in a direction corresponding to said desired direction and a second coordinate axis thereof extending in a direction different from said direction of said first coordinate axis, said first region having a first length thereof in said direction of said first coordinate axis of said first digital coordinate system and a second length thereof in said direction of said second coordinate axis of said first digital coordinate system, said first region having a first duty assigned thereto for a digital display of said first picture, to generate a second picture including a second region defined in a second coordinate system associated with a second format for formatting said second picture, said second region having a first length thereof in a direction of a first coordinate axis of said second digital coordinate system and a second length thereof in a direction of a second coordinate axis of said second digital coordinate system, said first length of said second region being digitally substantially equivalent to said first length of said first region times said multiplication factor, said second length of said second region being digitally substantially equivalent to said second length of said first region, said second region having said first duty distributed thereon as a second duty for a digital display of said second picture;

said multiplication factor source being operative for supplying a pair of said multiplication factors having respectively said desired directions thereof different from each other; and a pair of said directional multiplication operator means responsive to either one of said pair of multiplication factors to operate on said first picture in order to generate said second picture and to the other of said pair of multiplication factors in order to operate on said second picture as said first picture thereto to generate a third picture as said second picture therefrom.

6. A digital picture multiplication device for performing a first multiplication of a first picture composed of a plurality of first pixels including a first number thereof arrayed in a first direction, said first number of first pixels individually having a variable first image data, to provide a second picture composed of a plurality of second pixels including a second number thereof arrayed in a second direction, said second number of second pixels individually having a variable second image data, said digital picture multiplication device comprising:

a first associating means for associating a respective one of said first number of first pixels with a total of h of said second number of second pixels, where h is a positive integer digitally equivalent to a variable first multiplication factor of said first multiplication;

a first distribution means for distributing a total of h fractions of said first image data of said respective one of said first number of first pixels to said total of h second pixels associated therewith, as respective said second image data thereof, so that a compositional context of a first image representable by said respective first image data of said first number of first pixels is substantially left in a second image representable by said respective second image data of said second number of second pixels, wherein said digital picture multiplication device further performs a second multiplication of said second picture composed of said plurality of second pixels including a third number thereof arrayed in a third direction which is different from said second direction, said third number of second pixels individually having a variable third image data equivalent to said second image data of a corresponding one of said second pixels, as said corresponding second pixel exists, to provide a third picture composed of a plurality of third pixels including a fourth number thereof arrayed in a fourth direction, said fourth number of third pixels individually having a variable fourth image data.

7. A digital picture multiplication device according to claim 6, further comprising:

a second associating means for associating a respective one of said third number of second pixels with a total of k of said fourth number of third pixels, where k is a positive integer digitally equivalent to a variable second multiplication factor of said second multiplication; and a second distribution means for distributing a total of k fractions of said third image data of said respective one of said third total of second pixels to said total of k third pixels associated therewith, as respective said fourth image data thereof, so that a compositional context of a third image representable by said respective third image data of said third number of second pixels is substantially left in a fourth image representable by said respective fourth image data of said fourth number of third pixels.

* * * * *